US007271806B2

(12) United States Patent
Everett

(10) Patent No.: US 7,271,806 B2
(45) Date of Patent: Sep. 18, 2007

(54) INTERNATIONAL AUTOMATIC LINE HEIGHT SYSTEM AND METHOD

(75) Inventor: Nathan W. Everett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 10/322,857

(22) Filed: Dec. 18, 2002

(65) Prior Publication Data

US 2004/0123243 A1  Jun. 24, 2004

(51) Int. Cl.
*G06T 11/00* (2006.01)
*G06F 15/00* (2006.01)
*G06F 17/00* (2006.01)

(52) U.S. Cl. .................. 345/471; 345/467; 715/517

(58) Field of Classification Search ............... 345/471, 345/467; 715/517
See application file for complete search history.

(56) References Cited

U.S. PATENT DOCUMENTS

| | | | |
|---|---|---|---|
| 4,700,400 A | | 10/1987 | Ross |
| 4,851,825 A | * | 7/1989 | Naiman ............ 345/596 |
| 5,335,294 A | * | 8/1994 | Niki ............ 382/177 |
| 5,416,898 A | | 5/1995 | Opstad et al. |
| 5,513,277 A | | 4/1996 | Huttenlocher |
| 5,740,456 A | | 4/1998 | Harel et al. |
| 5,966,473 A | | 10/1999 | Takahashi et al. |
| 6,064,767 A | | 5/2000 | Muir et al. |
| 6,073,148 A | | 6/2000 | Rowe et al. |
| 6,075,892 A | | 6/2000 | Fan et al. |
| 6,256,650 B1 | | 7/2001 | Cedar et al. |
| 6,282,327 B1 | * | 8/2001 | Betrisey et al. ............ 382/299 |
| 6,310,624 B1 | * | 10/2001 | Watanabe ............ 345/467 |
| 6,320,587 B1 | | 11/2001 | Funyu |
| 6,330,577 B1 | | 12/2001 | Kim |
| 6,601,021 B2 | | 7/2003 | Card et al. |

(Continued)

FOREIGN PATENT DOCUMENTS

EP    0949801    10/1999

(Continued)

OTHER PUBLICATIONS

Nazir, TA, Jacobs, AM, & O'Regan, JK, "Letter legibility and visual word recognition," Memory & Cognition, Jul. 1998, 26 (4), 810-821.*

(Continued)

*Primary Examiner*—Jin-Cheng Wang
(74) *Attorney, Agent, or Firm*—Lee & Hayes, PLLC

(57) ABSTRACT

A system and method determines an optimum size for a font for readability. A method determines font characteristics by determining a character density for the font and multiplying the character density by a sharpest focusable area of the viewing medium. The method further includes varying the character density according to a range in a number of clusters per fixation to determine a maximum font size and a minimum font size. In an embodiment, the character density is a ratio of a number of clusters per em in the font to a number of visible clusters within a predetermined foveal angle. The predetermined foveal angle can be a field of vision for sharpest focus of an eye or a reader specific foveal angle that reflects the reader's visual acuity, taking into consideration macular degeneration, vision impairments, vision sharpness, tunnel vision, eye disease, near sightedness, far sightedness, dyslexia, and astigmatism.

2 Claims, 25 Drawing Sheets

U.S. PATENT DOCUMENTS

| | | | |
|---|---|---|---|
| 6,661,921 | B2 | 12/2003 | Tanioka |
| 6,683,611 | B1 | 1/2004 | Cleveland |
| 6,750,875 | B1* | 6/2004 | Keely et al. ............... 345/613 |
| 6,931,415 | B2* | 8/2005 | Nagahara ................... 707/102 |
| 6,975,761 | B1 | 12/2005 | Swann et al. |

FOREIGN PATENT DOCUMENTS

| | | |
|---|---|---|
| JP | 7049865 | 2/1995 |
| JP | 9146520 | 6/1997 |

OTHER PUBLICATIONS

Zwahlen, Helmut T. and Shaolin, Xiong. "Legibility of Text on Traffic Signs as a Function of Luminance and Size", Paper No. 01 2693 presented at the 80th Annual Transportation Research Board Meeting, Washington, DC, Jan. 7-11, 2001.*

Clark JJ, O'Regan JK, "Word ambiguity and the optimal viewing position in reading", Vision Res. Feb. 1999;39(4):843-57.*

D. Dhanya, A. G. Ramakrishnan, and P. B. Pati, "Script Identification in printed bilingual documents", Sadhana, vol. 27, Part 1, Feb. 2002, pp. 73-82.*

J. Hochberg; L. Kerns; P. Kelly; T. Thomas; "Automatic script identification from images using cluster-based templates", Proc. Document Analysis and Recognition, vol. 1, Aug. 14-16, 1995, pp. 378-381.*

V. Eglin; S. Bres; H. Emptoz; "Printed text featuring usin g the visual criteria of legibility and complexity", Proc. Pattern Recognition, vol. 1, Aug. 16-20, 1998, pp. 942-944.*

Marc Brysbaert et al.; "The Right Visual Field Advantage and the Optimal Viewing Position Effect: On the Relation Between Foveal and Parafoveal Word Recognition," 1996 (pp. 385 through 395).

Helmut T. Zwahlen et al.; "Legibility of Text on Traffic Signs as a Function of Luminance and Size," 2001 (16 pages).

Tatjana A. Nazir and Arthur M. Jacobs; Letter legibility and visual word recognition; Jun. 12, 2001; pp. 1-22; http://nivea.psycho.univ-paris5.fr/Papillon/Papillon.html.

James J. Clark and J. Kevin O'Regan; Word Ambiguity and the Optimal Viewing Position in Reading; Jun. 9, 1998; pp. 1-49; Preprint submitted to Elsevier Preprint; Laboratoire de Psychologie Expérimentale Centre National de la Recherche Scientifique Université René Descartes EPHE, EHESS, Paris, France.

H. Alvestrand; Tags for the Identification of Languages; Mar. 1995; pp. 1-8; http://www.ietf.org/rfc/rfc1766.txt.

ISO 639-2; Codes for the Representation of Names of Languages; Aug. 14, 2002; pp. 1-16; http://lcweb.loc.gov/standards/iso639-2/langcodes.html.

Bos et al., Cascading Style Sheets, level 2, CSS2 Specification, May 12, 1998, 25 pages.

Delaplain et al.; Line Spacing Between Successive Lines of Fonts Having Differing Heights, IBM Technical Disclosure Bulletin, Sep. 1984, vol. 27, No. 4B, p. 2374.

Holleran et al., Vertical Spacing of Computer-Presented Text, 1993, ACM Press, Conferene on Human Factors in Computing Systems, Interact :'93 and Chi '93 Conference Companion on Human Factors in Computing Systems, pp. 179-180, Amsterdam, The Netherlands, XP002344749 p. 17-, lrft-hand column, lines 29-37, p. 180, right-hand column, line 10-23.

IBM, Character Size Measurement, retrieved from the Internet Sep. 13, 2005: http:/web.archive.org/web/20020220160337/http:///www.pc.ibm.com/ww/healthycomputing/vdc-org.html] p. 1, lines 23-28.

Kahn et al., Principles of Typography for User Interface Design, Interactions, Nov. 1998-Dec. 1998, pp. 15-29.

Meko, Ltd, Flat Panels & The European Display Screen Directive, A Question of Character, Sep. 2002.

Thornton, James., Font Specification Options, Apr. 2, 2002, retrieved from the Internet Sep. 15, 2005, http://jamesthornton.com/emacs/node/emacs_537.html, 2 pages.

Zramdini et al., Optical font Recognition from Projection Profiles, Electronic Publishing, vol. 6 No. 3, Sep. 1993 pp. 249-260.

Arditi, et al., "Reading with fixed and variable character pitch", Optical Society of America, vol. 7, No. 10, 1990, pp. 2011-2015.

* cited by examiner

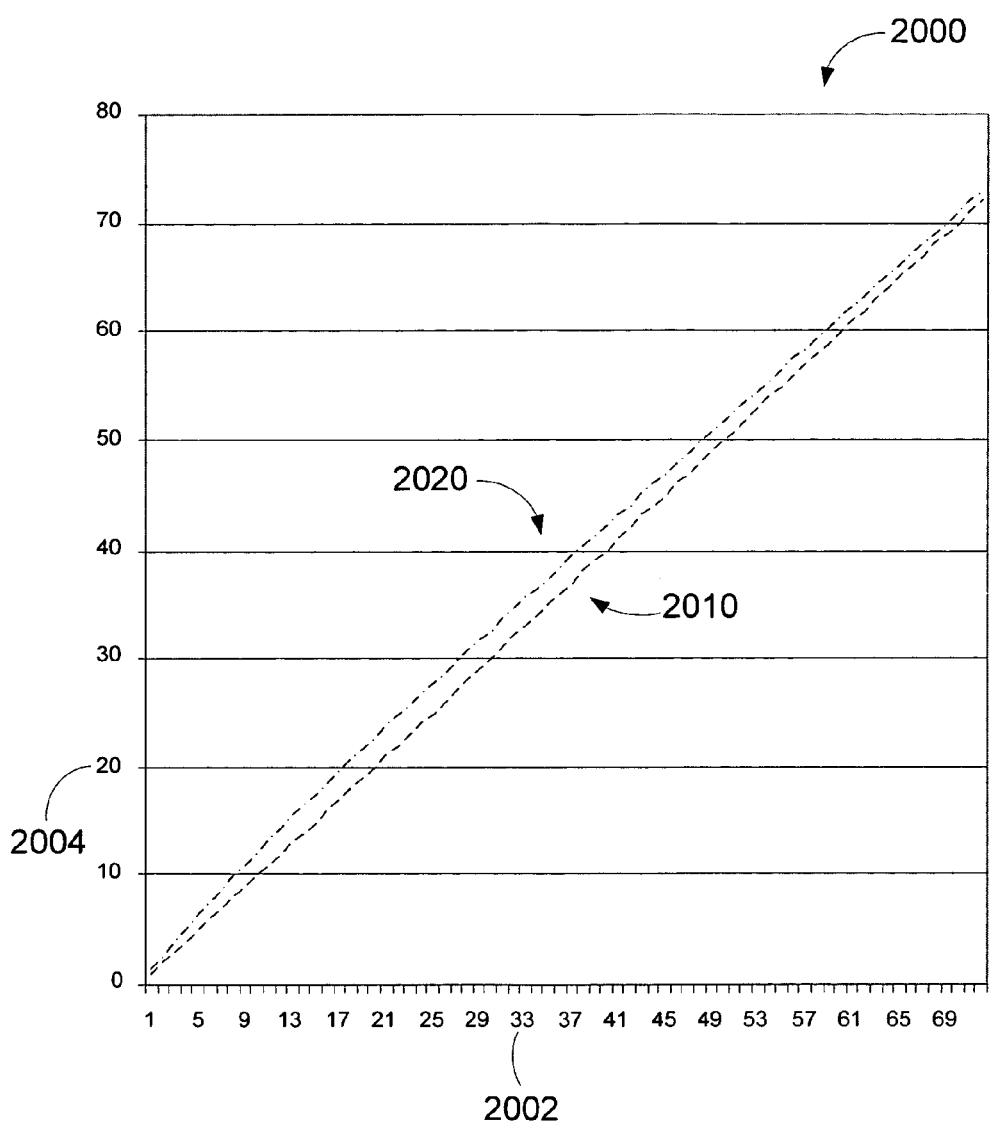

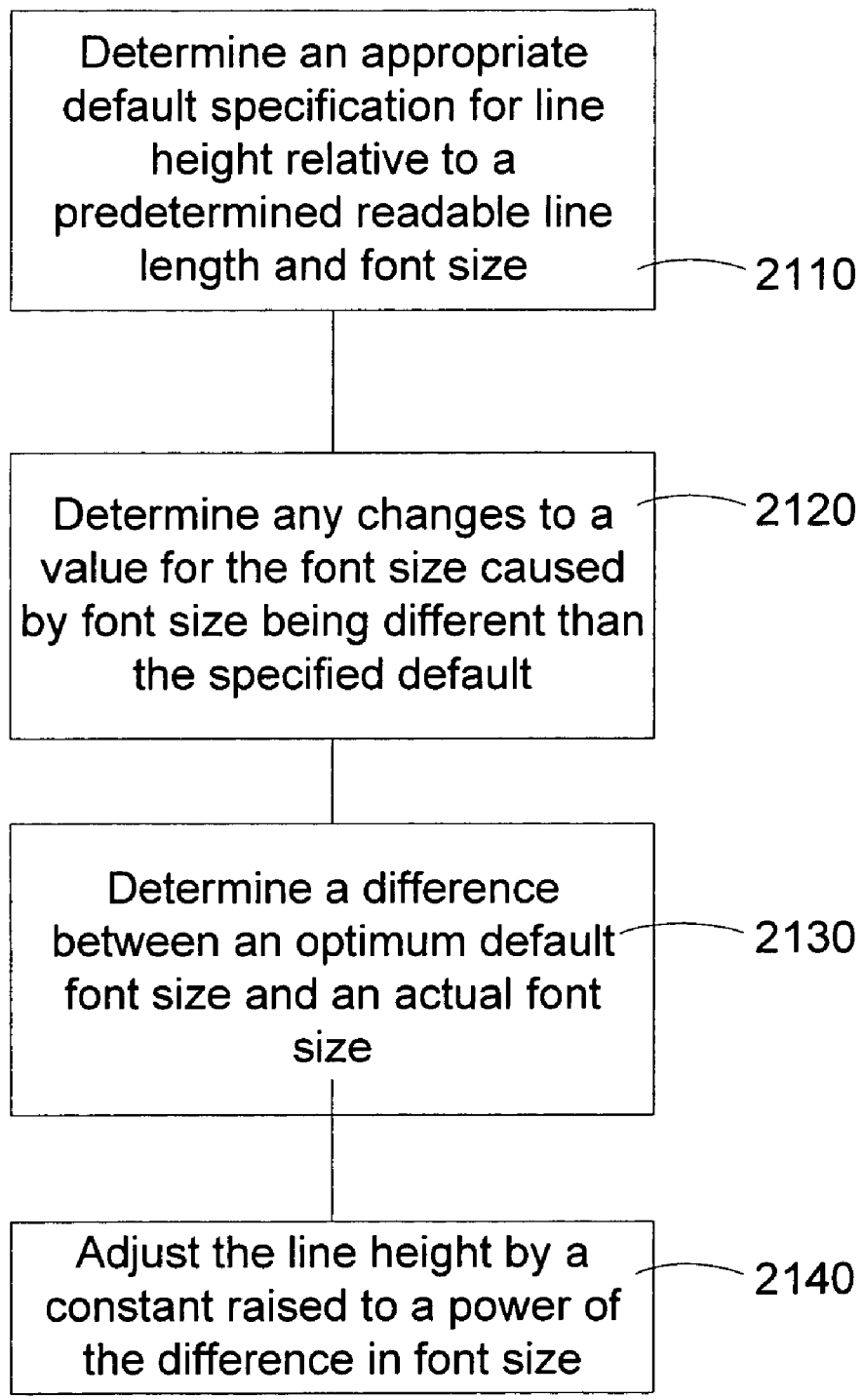

INTERNATIONAL AUTOMATIC LINE HEIGHT SYSTEM AND METHOD

FIELD OF THE INVENTION

This invention relates generally to type, text and character alignment, and more particularly, to an automatic line height system and method.

BACKGROUND OF THE INVENTION

"They said: Come, let us make a city and a tower, the top whereof may reach to heaven; and let us make our name famous before we be scattered abroad into all lands." The work was soon fairly under way; "and they had brick instead of stones, and slime (asphalt) instead of mortar." But God confounded their tongue, so that they did not understand one another's speech, and thus scattered them from that place into all lands, and they ceased to build the city. Genesis 11:1-9. Since the fall of the Tower of Babel, finding methods of communicating with different languages and their associated writing systems has been a challenge.

With the onset of worldwide globalization, overcoming this challenge has become paramount. However, there are complex cultural differences between nations that have prevented a fully integrated global society. In the computer industry, these differences cause problems with international cooperation due to the tethers of multi-language display and interchange.

One step toward meeting the challenge of a multi-national computing industry was the Unicode Consortium formed in 1988, which developed a global character identification standard. The goal of the consortium was to develop a standard that allows a unique identification of characters for every language. The consortium developed the Unicode Standard, now in version 2.1, available from Addison-Wesley Developers Press 1997, (available at http://www.unicode.org).

Unfortunately, being able to print and display a character from a choice of many languages is only a small step toward meeting the international challenge. An issue of equal and oft times more importance is the layout of script, the characteristics of fonts, and the general requirements of text that make text readable. However, typefaces and script forms of current languages are different, eclectic and do not follow the same rules. For example, a typical English font, Times New Roman, follows a typographical formula that is uniquely Roman based wherein line height is typically set to be 120% of the size of the font in points. Terminology is based on Roman characters. The concepts of Roman type include a base line, a cap height, an ascender height, a descender height and line height.

Written languages do not follow the same rules for font characteristics such as a default line length or typeface. Rather, each language and script is culturally derived from a different basis. For example, some Asian scripts use glyphs that are pictorially derived and other Asian scripts read from right to left and are symbolically derived. Even within the same language, scripts and fonts do not follow a predetermined characteristic formula. Finding a formula for determining default font characteristics seems an impossible task. Rather than finding a formula appropriate for all languages, graphic designers have relied on visually altering line length, typeface and line heights, altering each script such that a rendering is pleasing to the eye and meets readability requirements known to the graphic designer.

Currently, there is no solution for determining font characteristics that applies to all known scripts. Every script is culturally derived and has a different basis and completely different concepts. Even if a formula worked for a particular script in a particular language within each script, there is not a linear relationship to many characteristics of the script. For example, any changes to font size or line length in the same script require changes in line height that take into account readability. Graphic designers typically visually alter line length, typeface, and line height. Longer lines of type require more line height for readability. Also, the size of a font is relevant to line height, but a larger font does not require the same line height as a smaller font.

Because there is no linear or obvious relationship between line height, line length and changing font sizes, many computer applications require manual changes. Further complicating the layout issues, graphic designers do not know the rendering device of type due to the plethora of rendering computing machines. A typed page designed for a web page, for example, can be rendered on any size screen, leaving the optimum reading sizes for line length, line height and font size as an unknown. What is needed is a method for automatically determining those characteristics that currently require a graphics designer. An automatic method and system that can compute readability parameters, such as line height, font size and line length is needed so that text can be rendered on any display, in any language and in any size without manual adjustment.

BRIEF SUMMARY OF THE INVENTION

Accordingly, a system and method automatically determines an appropriate line height for different display mediums and different readability parameters in any language. One embodiment is directed to a method for determining a line height for a string of text, and includes determining a value representing a number of clusters per em in the string of text and scaling a default line height by an exponential function. The default line height used in the function can be approximately 120% of a font size used in the string of text.

Another embodiment is directed to a computer system with a data structure configured to hold a plurality of elements defining font characteristics and a module coupled to the data structure, the module adjusts line height dynamically as viewing conditions change by using font characteristics and applying an exponential function to an average width of a cluster with the font characteristics. The data structure is within a layout engine. The layout engine includes a structure and layout input filter configured to receive a plurality of text properties from an application. The layout engine also includes a text engine configured to receive at least one of the plurality of text properties and to determine the average width of the cluster in the font, and a reading metrics engine coupled to receive the average width of the single cluster in the font from the text engine and apply the exponential function. The module applies the exponential function, which is a default font size multiplied by the square root of a function of the average width of the cluster.

There are various embodiments directed to the module and methods performed therein. In one embodiment, the module is an optimum readable line height multiplier module configured to determine a ratio of a gray value of a predetermined portion of the text to a total gray value of the text and divide the ratio by a character density of a predetermined font for the text, and add one to the divided ratio to determine a multiplier of a font size. In some embodiments, the module determines a line height and multiplies the line height by a markup line height scale. In one embodiment, the module determines line height according to a function of a font size multiplied by $(R_w^2+(1/C_{pm}^2))^{1/2}$ wherein $R_w$ is an actual height of type from its top ink to its bottom ink per em, and $C_{pm}$ represents a number of characters per em. In another embodiment, the module determines an area of at least three predetermined representative portions of the text and multiplies the area by a font size to determine a line height. The module can also determine line height by determining an average grayness of a representative sample text in the font, multiplying the average grayness by a number of clusters per em for the font, and multiplying a font size by an inverse of the product of the average grayness and number of clusters per em. More specifically, the average grayness is a first portion identifying a darkest portion of the representative sample text, a second portion identifying a portion before the darkest portion, and a third portion identifying a portion after the darkest portion, the average grayness being a sum of the first, second and third portion widths multiplied by respective depths for the first, second and third portions. In another embodiment, the module can adjust line height by determining a character density of the font, dividing a contrast of the font by character density to obtain a fraction of the font size, and adding the fraction to the font size to adjust the line height.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 20 is a graph illustrating empirically found line height possibilities for a given character size in points in accordance with an embodiment of the present invention.

FIG. 21 is a flow diagram illustrating a method for determining adjustments to a default line height in accordance with an embodiment of the present invention.

DETAILED DESCRIPTION OF THE INVENTION

Figure 1:
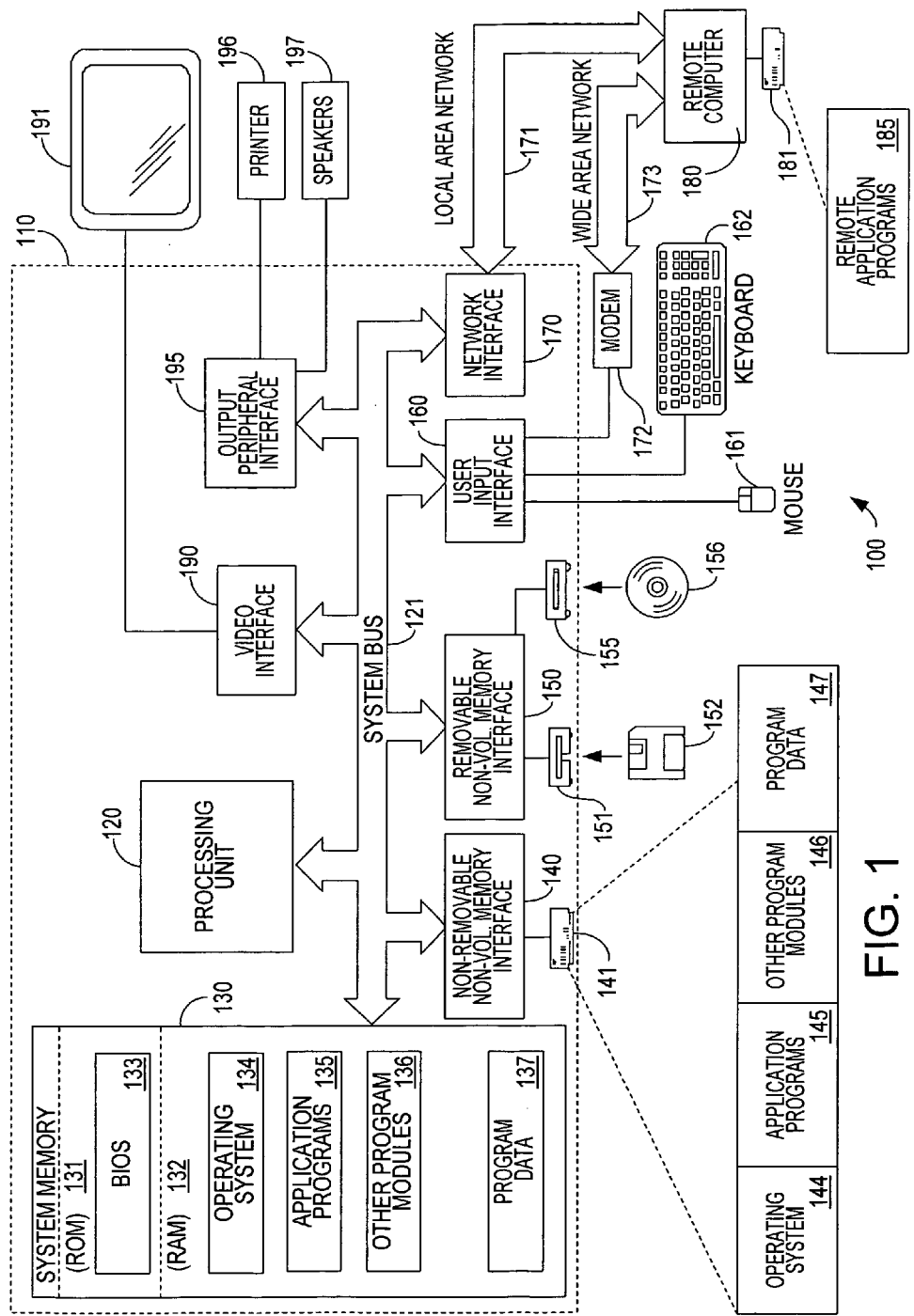
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc., that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. The manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
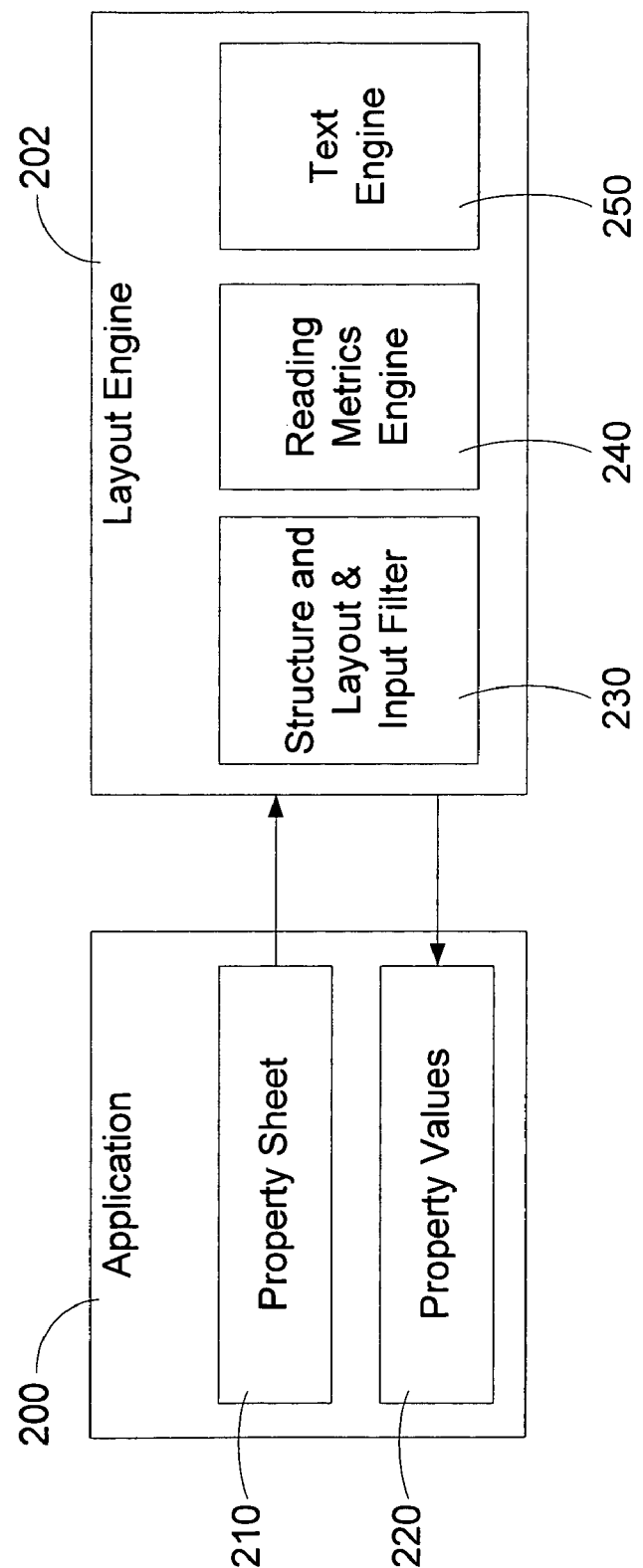
FIG. 2 is a block diagram illustrating an exemplary data flow within a computer system in accordance with an embodiment of the present invention.

In accordance with one important aspect of the invention, reference is made to FIG. 2, which represents a block diagram for client software, such as a Windows® client appropriate for implementing embodiments of the present invention. The block diagram shows Application 200, which could be any application running on computer 110 shown in FIG. 1. Appropriate application programs include, for example, Microsoft Word, Microsoft Publisher, QuarkXPress, Adobe InDesign and the like. Application 200 is shown including a property sheet 210 and output property values 220. Property sheet 210 interacts with a layout engine 202 which can be within computer 110 or available via a client-server connection. Layout engine 202 can be a client application running on computer 110 or can be available via a network connection. Property sheet 210, within application 200, supplies property values to layout engine 202, which are received at structure and layout, input filter 230. In addition to structure and layout input filter 230, layout engine 202 also includes reading metrics engine 240 and text engine 250. The property sheet data structures include those elements required by layout engine 202 to provide an appropriate layout for rendering fonts and text for application 200. Structure and layout input filter 230 organizes the elements for input into reading metrics engine 240 and provides the input properties to reading metrics engine 240. Reading metrics engine 240 operates on the properties and sends data to text engine 250. Text engine 250 receives data including identifiers for font family data and identifiers for a language and outputs calculated data concerning text characteristics for use by reading metrics engine 240.

As described in more detail below, reading metrics engine 240 operates on input values to provide optimal typographic settings within given constraints from calling applications. Input constraints can include, but are not limited to, environmental constraints and design constraints. Environmental constraints can include magnification, screen size and resolution, reader optical enhancement, and reader distance. Design constraints can include font requirements, margin requirements, column requirements, and layout rectangle requirements. Within these constraints, reading metrics engine 240 provides settings including those for window, page and live matter sizes, margin widths, optimal column number, optimal column and gutter widths, and optimal font size and line height. The settings provided can be in pixel measurements or in point measurements according to design requirements. Advantageously, the settings output by reading metrics engine 240 are appropriate for known languages and fonts.

Figure 3:
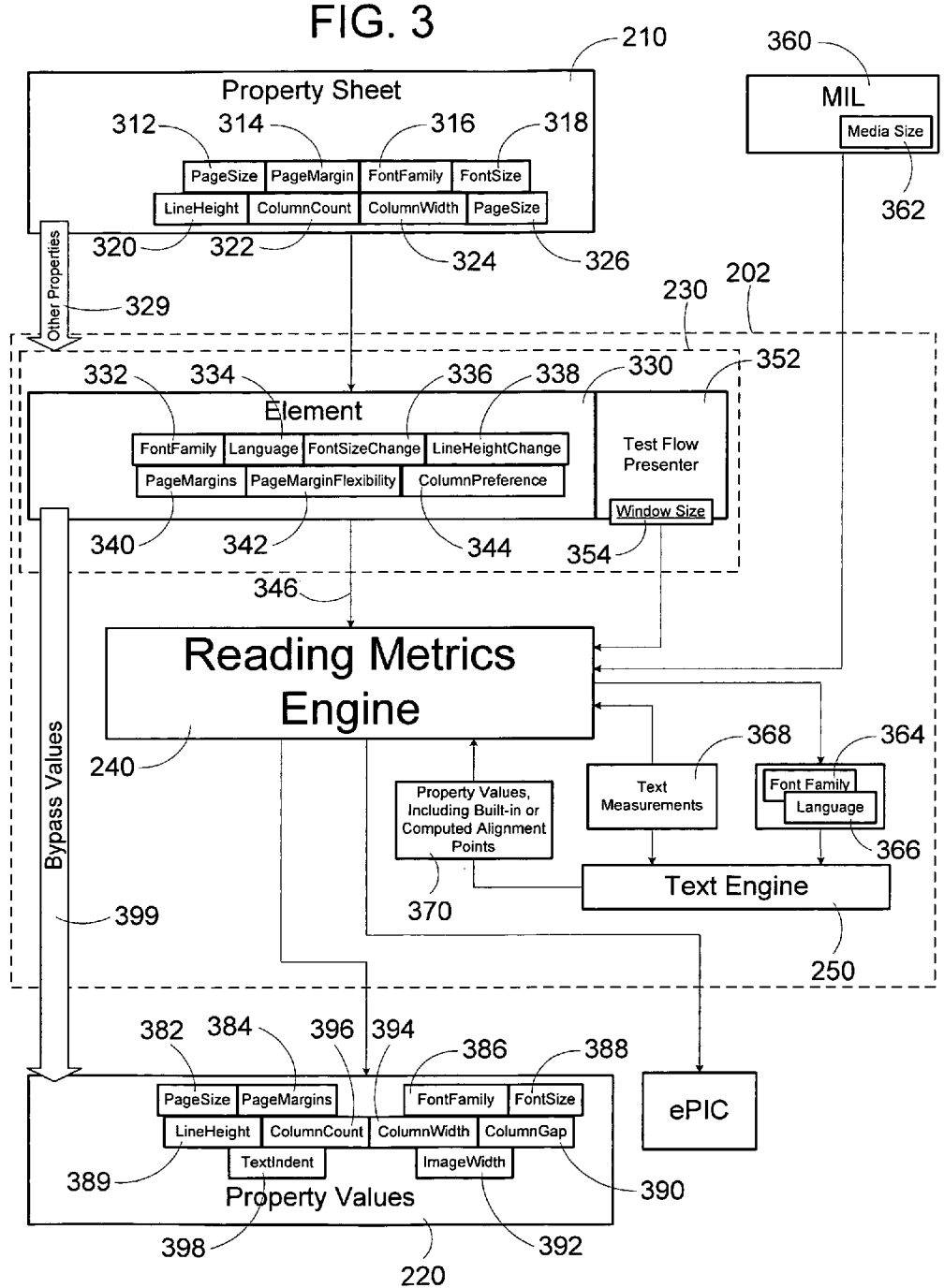
FIG. 3 is a more detailed block diagram illustrating the data flow shown in FIG. 2 in accordance with an embodiment of the present invention.

Referring now to FIG. 3, the block diagram of FIG. 2 is expanded in block diagram form to illustrate the data structure flow. FIG. 3 illustrates a property sheet 210, including items such as a page size 312, a page margin 314, a font family 316, a font size 318, a line height 320, a column count 322, a column width 324 and a page size 326. Also included in the property sheet 210 are values that cannot be overridden. The values that are adaptable via block 329 and those that are not are supplied to structure and layout input filter 230. More particularly, structure and layout input filter 230 includes element block 330 and text flow presenter 352. Element block 330 organizes the data into a data structure. An exemplary data structure is shown including font family 332, language 334, font size change 336, line height change 338, page margins 340, page margin flexibility 342 and column preference 344. The data is organized in element block 330 and provided as reading metrics engine input properties 346. Separately, text flow presenter 352 provides a window size 354 to reading metrics engine 240. Text flow presenter 352 can alternatively be a networked component, or a system component within computer 110. In one embodiment, layout engine 202 interacts with a media integration layer 360. Media integration layer 360 provides a media size 362 to reading metrics engine 240. One example of a media size 362 includes a size of a screen for computer 110 shown in FIG. 1.

Reading metrics engine 240 implements embodiments of the present invention as discussed in further detail below. In one embodiment, reading metrics engine 240 interacts with text engine 250 and element block 330. Element block 330 holds the reading metrics engine input properties 346. Element block 330 is coupled to text flow presenter 352. In one embodiment, element block 330 and text flow presenter 352 together form one component including a structure in element block 330 and a layout in the text flow presenter 352.

The reading metrics engine 240 receives the inputs and operates on them to produce useful settings for layout of text in the calling application. The settings can take into account user settings for sizing or default sizes can be automatically determined.

Text engine 250 is an important feature of the layout engine 202. Text engine 250 supplies inputs to reading metrics engine 240 that add language specific data concerning text values. Text engine 250 receives a font family identifier 364 and a language identifier 366. The output from text engine 250 includes measured values computed internally to the text engine 250, such as text measurements 368 and property values 370. More specifically, as explained in further detail below in FIG. 5, text engine 250 measures the ratio of black and white pixels in each row of pixels in a rendered line of type and provides those measurements using terms that identify characteristics of a representative line of text in the font and language provided. These text measurements 368 and the property values 370 which include built in or computed alignment points are provided to reading metrics engine 240. Reading metrics engine 240 applies equations and the like to the measurements and the input properties 346 to provide output property values 220 including page size 382, page margins 384, font family 386, font size 388, line height 389, column gap 390, image width 392, column width 394, column counts 396 and text indent 398. These properties are returned to the calling application 200.

Figure 4:
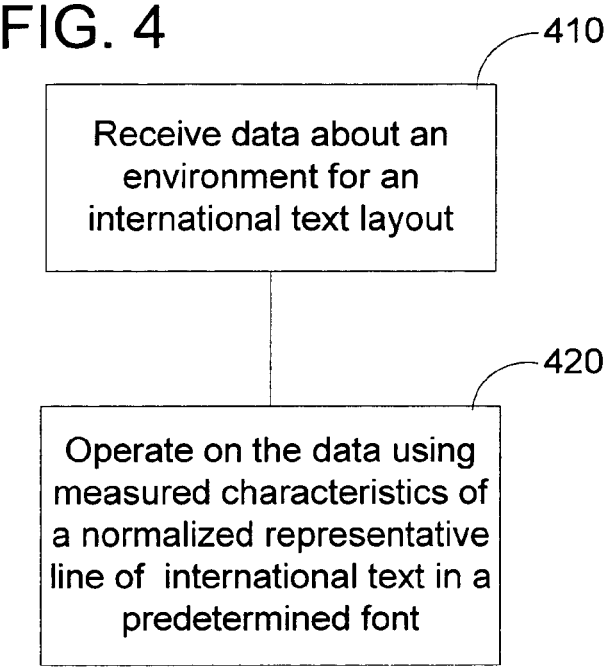
FIG. 4 is a flow diagram illustrating a method for determining international text characteristics in accordance with an embodiment of the present invention.

Referring now to FIG. 4 in combination with FIG. 3, a method of determining text layout properties according to an embodiment is illustrated in a flow diagram. The method relates to the functions performed in reading metrics engine 240 and text engine 250 shown in FIGS. 2 and 3. Specifically, block 410 provides for receiving data about an environment for an international text layout. As shown in FIG. 3, the data can include elements from one or more of property sheet 210, text flow presenter 352 and text engine 250. The data about the environment includes data concerning the rendering medium, such as screen size, paper size and the like as well as user defined or system required parameters concerning margins, font sizes, columns, line height, line length and language. Block 420 provides for operating on the data using measured characteristics of a normalized representative line of international text in a predetermined font and measured characteristics of the environment. The characteristics of a normalized representative line of international text are measured in text engine 250. Reading metrics engine 240 can be coupled to text engine 250 or can call text engine 250 via an application program interface (API). The environmental characteristics are measured in reading metrics engine 240. After receiving the measured characteristics of a normalized representative line of international text, reading metrics engine 240 performs a plurality of operations on the data. The output of the reading metrics engine is provided to calling application 200.

Figure 5:
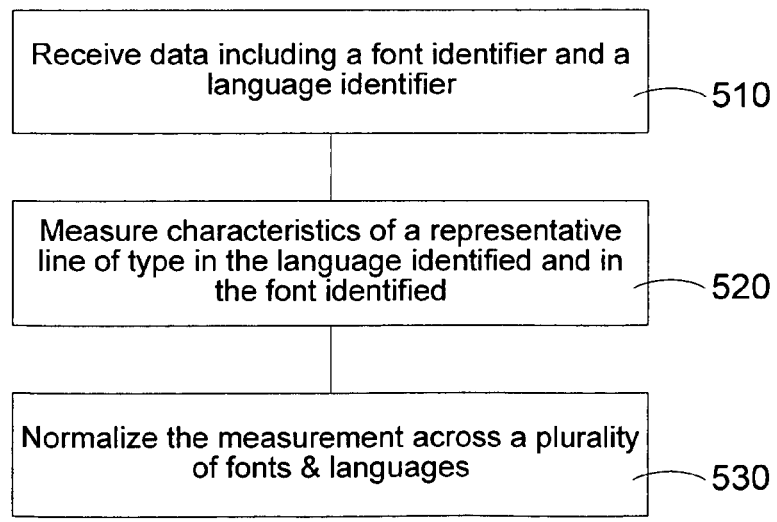
FIG. 5 is a flow diagram illustrating a more detailed method for determining international text characteristics in accordance with an embodiment of the present invention.
Figure 6:
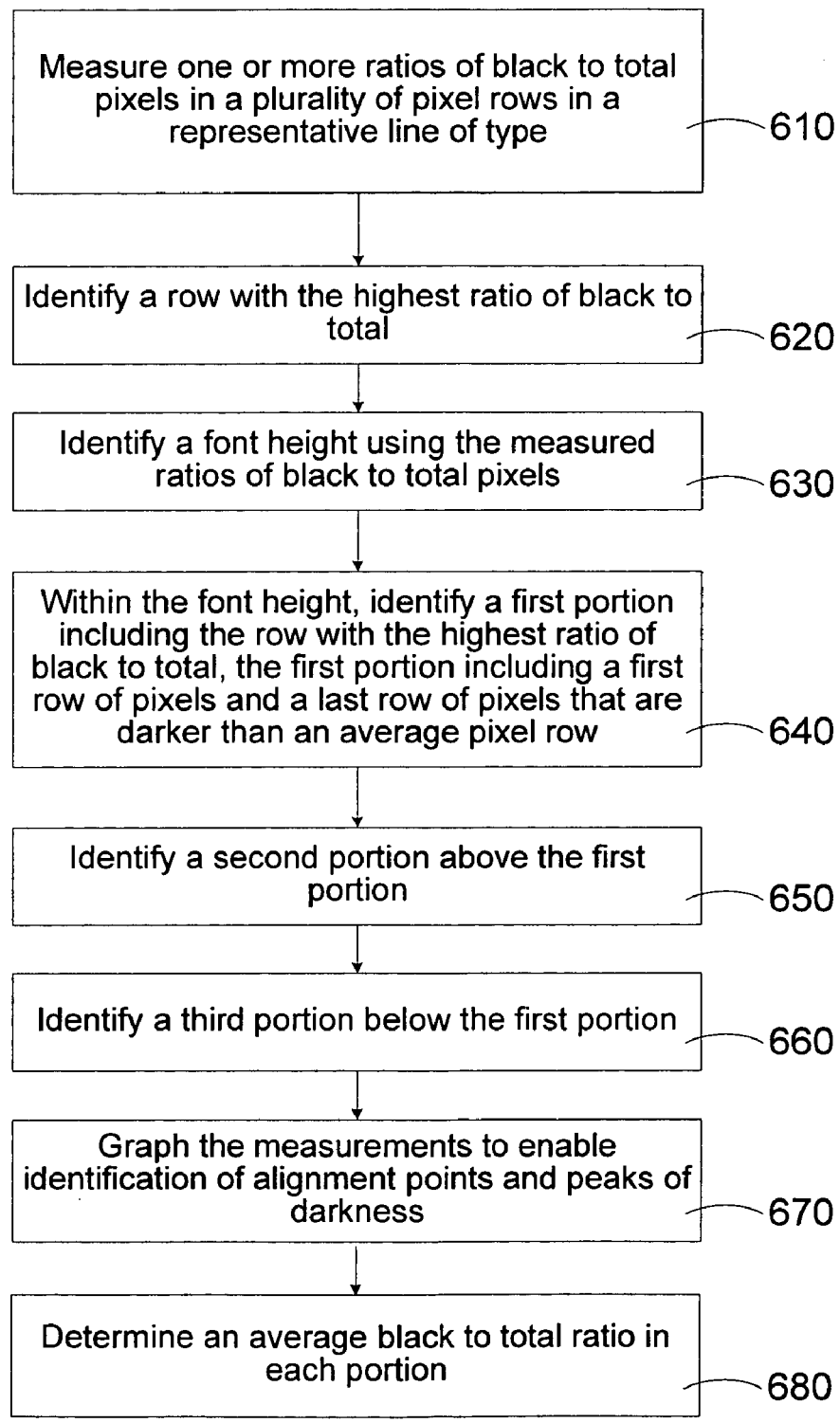
FIG. 6 is a flow diagram illustrating a more detailed method for determining international text characteristics in accordance with an embodiment of the present invention.

The operation of text engine 250 is described in further detail in flow diagram form in FIGS. 5 and 6. As shown, text engine 250 receives data including a font family identifier 364 and a language identifier 366 in block 510. In block 520, the text engine measures characteristics of a representative line of type in the identified language and in the identified font. Advantageously, the measurements allow unbiased determinations of font sizes and line heights for any given language and font, in any given layout. In block 530, text engine 250 normalizes the measurements across a plurality of fonts and languages. The measurements are then used to determine appropriate sizings.

For purposes of this disclosure, terms for the sizings include, but are not limited to, line height, which is the distance from the baseline of one line of type to the baseline of the next line. A baseline is the perceived line on which characters in a writing system sit, or from which they hang. For English characters, a baseline refers to an imaginary line on which the upper and lower case characters sit. An X-height refers to a standard height of lower case letters, approximately equivalent to the height of a lowercase x in the font. A cap-height refers to the height of capital letters in a line of type, not equal to, but often equated with the ascender height. In some fonts the ascenders are taller or shorter than the height of most capital letters. An ascender is the part of lower case letters l, t, f, b, d, h, k that extend above the x-height. Descender refers to the part of lower case letters g, j, p, q, y that extend below the baseline.

An em is a unit of measurement equal to the size of the font. Thus, em is a variable unit that changes whenever the font size changes. An em for purposes of this disclosure is the square of the type being measured. For example, if the font is rendered in 12-point type, the em is 12 points high and 12 points wide. If the font is rendered in 100-point type, the em is 100 points high and 100 points wide. Therefore, the em is used as a non-representational size unit for the type and is based on the way the type is designed, not on physical characteristics. As a result, some font designs may have ink that lies outside the em, such as Thai, and others take considerably less space than the em, such as Korean.

A "cluster," for purposes of this disclosure, refers to a rendering unit of the analyzed font and text. Specifically, a cluster is printed matter between points where a cursor may be inserted in the line of electronic text. The term cluster is ubiquitous because it is identified by a lack of space on a line and not by keystrokes, characters, or glyphs, and, therefore, appropriate for all languages. In Latin fonts, the cluster and the character may be equivalent.

Referring now to FIG. 6, the method of FIG. 5 is described in further detail. The methods described in FIG. 6 provide a numerical characterization of the grayness of any type of text in any font and in any language. The numerical characterization is based on what a reader sees when type is laid out on a page, i.e., a number of dark lines along which the eye follows in the act of reading. Because the size of these lines and the space between them vary with differing writing systems, script types, languages and cultures, the measurements are designed to be appropriate for any writing system in any language. The inked space in a line of text is referred to herein as a "black river." Specifically, the black river refers to the total space taken by ink in a single line of text of the given font and language including the highest and lowest points of ink in a representative line of type.

The methods in which the black river is measured are described in FIG. 6. After receiving the font family identifier and language identifier, as shown in block 610, text engine 250 measures ratios of black to total pixels in a plurality of pixel rows in a representative line of type. In one embodiment, text engine 250 measures the ratio of black to total pixels in each row of pixels in the rendered line of type. After each row of pixels that has black pixels in it has been measured, the row with the highest ratio of black to total is identified and then normalized to black as shown in block 620. The measurements of all other rows are normalized to that black point. The normalization enables equivalent measurements from fonts of various weights, such that the black point of the font can be normalized across all fonts. For example, a darkest part of the black river, as measured in $\frac{1}{200}$th of an em, is considered to be 100% black, no matter what degree of blackness it is in reality. All other parts of the black river are measured for gray depth as a value between 0% (white) and 100% (normalized black, or the darkest part of the river).

The average ratio is computed, and then the first row of pixels and the last row of pixels that are darker than the average are marked.

Block 630 provides for identifying the font height using the measured ratios of black and total pixels. In block 640, the text engine uses the font height and identifies a first portion, referred to herein as a "channel" including the row with the highest ratio of black to total, the first portion including a first row of pixels and a last row of pixels that are darker than an average pixel row. In Latin texts, the channel equates to the x-height. In other script types there is no direct equivalent of an x-height. Because each font in each language rendered in a line of text will have a dark part in the line of text, instead of an x-height, embodiments herein refer to a channel and measurements relative to the channel. In many embodiments described herein, the channel is an important measurement for determining the appropriate line height and other settings for a line of text in a script.

In block 650, text engine 250 identifies a second portion above the first portion. In block 660, text engine 250 identifies a third portion below the first portion. The second portion and the third portion are referred to herein as "before shallows" and "after shallows" respectively, and collectively as "shallows." In most scripts there are typically shallows on both sides of the identified channel. The shallows are areas where the line of type has ink, but not every character extends into it. In Latin, the type has shallows that are equivalent to the ascender and descender. A language with a great number of accent marks typically has a shallows including the accent marks. A language that is substantially uniform can be identified as having a channel with little or no shallows. Many Asian languages would be identified as having only a channel and no shallows. These languages have a river and a channel that are the same size.

In block 670, text engine 250 graphs the measurements to enable identification of alignment points, peaks of darkness and the like.

After identifying the channel and the shallows, block 680 provides for determining an average black to total ratio in each portion. The portions describe a line of type in a particular font by providing widths of three measurements including a width of the channel, a width before shallows and a width after shallows.

In one embodiment, text engine 250 returns measurements to reading metrics engine 240, including one or more of a black to total ratio of the darkest row of pixels, an average black to total ratio of the entire representative line of type, a width of the before shallows, a black to total ratio of the before shallows, a width of the channel, a black to total ratio of the channel, a width of the after shallows, and a black to total ratio of the after shallows. When a language is written vertically, such as certain Asian languages, the same measurements can be made by measuring columns of vertical type for the vertical language instead of measuring rows of horizontal type for horizontal languages. As will be appreciated by those of skill in the art with the benefit of this disclosure, the principles for determining vertical language characteristics are the same, such that, for example, a channel of vertical type will be 90 degrees displaced for measurement from a channel of horizontal type.

In other embodiments, additional measurements can be returned as needed by reading metrics engine 240, such as alignment points at different degrees of fineness than the three portions, or measurements that correspond to the darkest rows, or the peaks in any graphs created.

Figure 7:
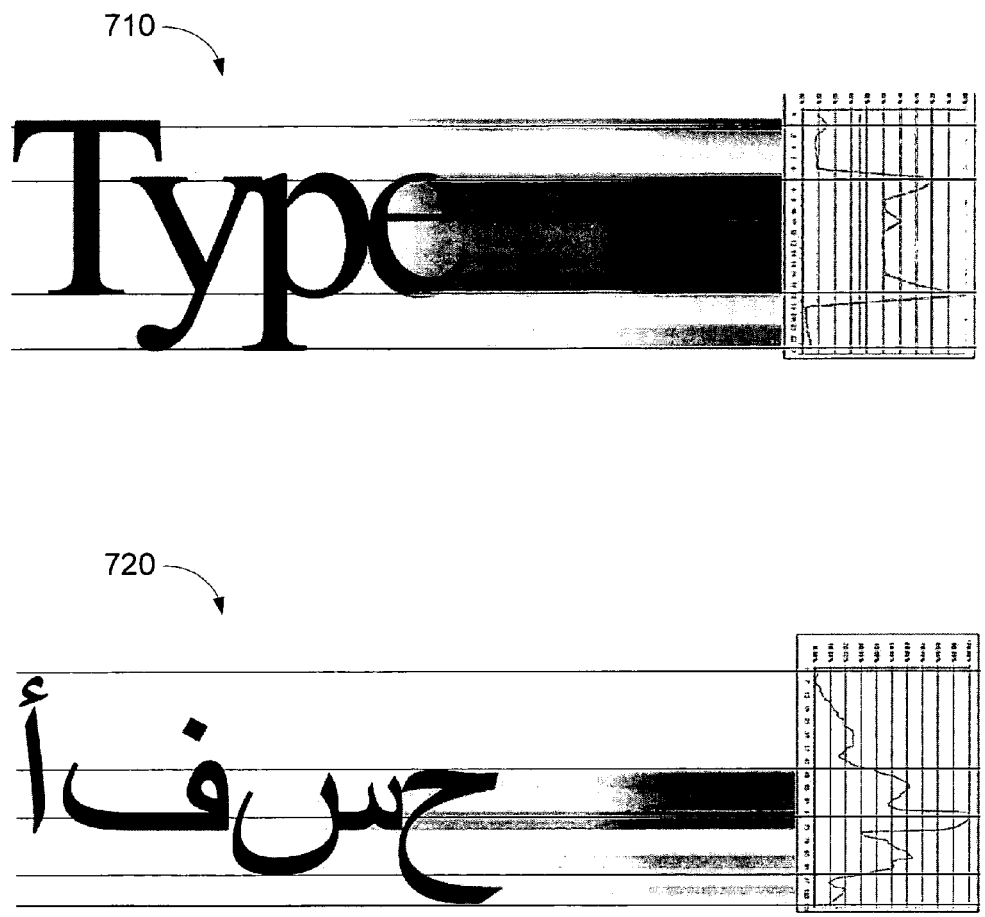
FIG. 7 illustrates two pictures representing graphs and text resulting from applying methods in accordance with an embodiment of the present invention.

Referring to FIG. 7, a photograph of simulated text with corresponding graphs according to an embodiment is shown. Photograph 710 illustrates a serif Latin font, showing that the peaks are generally at the top of the cap, at the x-height, at the crossbar of the lower case "e", at the baseline, and at the descender. In contradistinction, photograph 720 illustrates a non-Latin script form with different and more centered alignment points.

Another measurement returned can be measurements in relation to an em. In text engine 250 and in the reading metrics engine 240, an em is used to establish both horizontal and vertical measurements. Another measurement that can be returned by text engine 250 is the cluster per em, which can also be a measurement returned to reading metrics engine 240. Clusters per em are equivalent to a ratio of the height of the font to the average cluster width.

Other measurements that can be useful for reading metrics engine 240 include the width of the black river as a real number relative to the em; the width of before shallows as a real number relative to the em; the width of after shallows as a real number relative to the em; the width of the channel as a real number relative to the em; the average depth of the channel and of each of the shallows as a real number such that 0=all white, and 1=all black after normalization; an average number of clusters per em; and a total number of clusters in the representative line of text. The width values can be returned to reading metrics engine 240 as a real number relative to the em, and the depth values can be returned to reading metrics engine 240 as a real number relative to a normalized black point. The total number of clusters, in one embodiment, is prestored in a language table in either reading metrics engine 240 or text engine 250.

Figure 8:
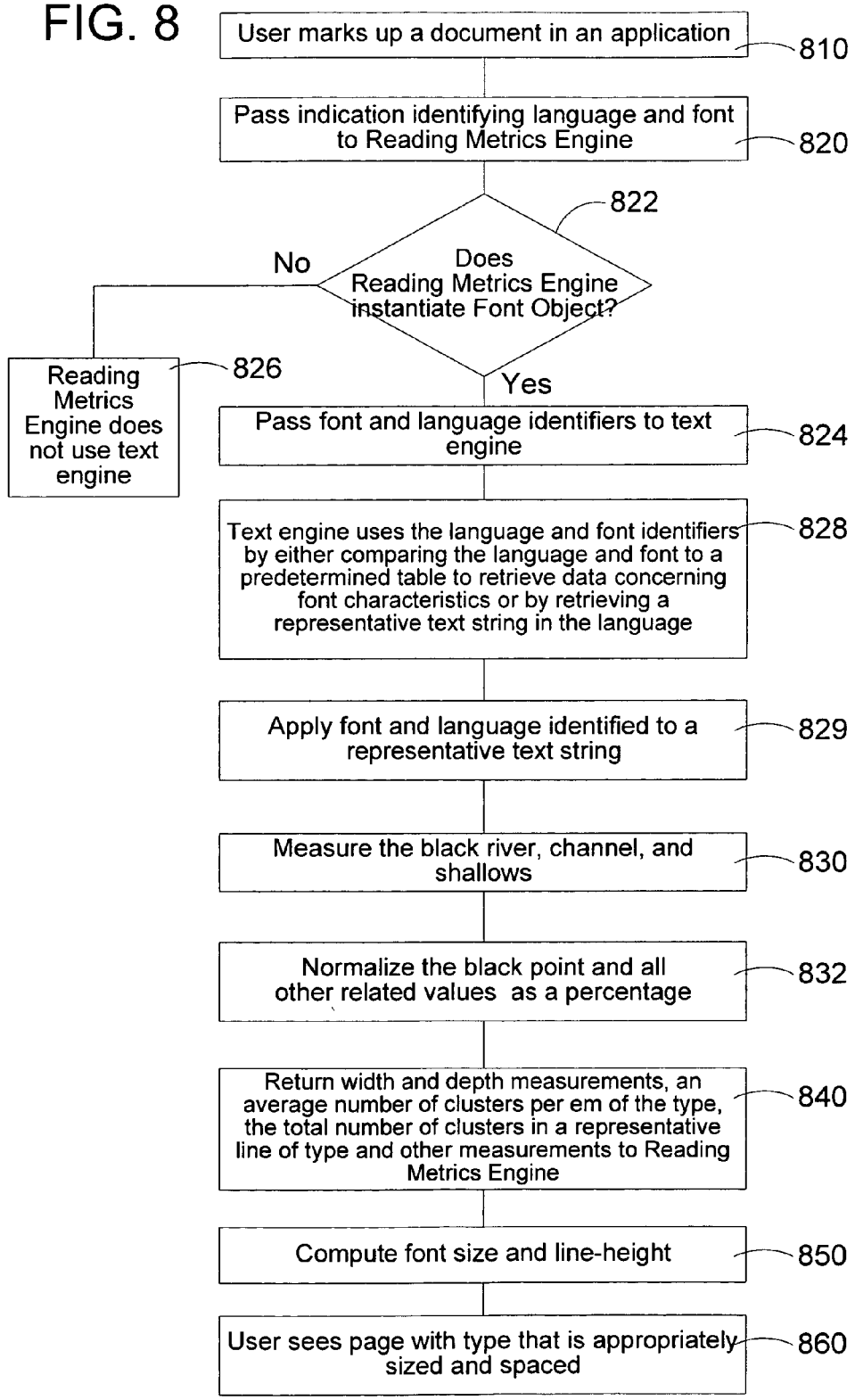
FIG. 8 is a flow diagram illustrating a method for automatically determining line height and font size in accordance with an embodiment of the present invention.

FIG. 8 illustrates an exemplary method in a flow diagram illustrating the interaction between reading metrics engine 240 and actions within text engine 250. In block 810, a user marks up a document in an application. The mark up includes an indication of a language and a font. The indication can be via a system link or via a user input. The indication identifying language and font is passed in block 820 to reading metrics engine 240. In one embodiment, text engine 250 exposes a Font Object and an API that reading metrics engine 240 can call for measurements. If reading metrics engine 240 instantiates the Font Object in block 822, the font and language identifiers are passed to text engine 250 as indicated at 824. If not, reading metrics engine 240 operates on the language and font without calling the text engine 250 as indicated at 826. For example, if reading metrics engine 240 has a table with the necessary measurements for that font and language, calling text engine 250 is unnecessary. Block 828 provides that, within text engine 250, the language and font identifiers are used by either comparing the language and font to a predetermined table to retrieve data concerning font characteristics or by retrieving a representative text string in the language. If a representative text string is retrieved, the font or font family is applied to the language to create a representative text string in block 829, which can be a single line of text or other appropriate measurable format. Block 830 provides that text engine measures the black river, channel, and shallows. Block 832 provides that text engine 250 then normalizes the black point and all other related values as a percentage. Block 840 provides that the text engine 250 returns width and depth measurements, an average number of clusters per em of the type, the total number of clusters in a representative line of type and like measurements, such as those described above.

In one embodiment, text engine 250 measures the rows of pixels in the representative line of text at ½₀₀th of an em intervals and records the ratio of black pixels to total pixels in the representative line of text as an average level of gray. The measuring can be done either as a value from 0-255, or as a percent to two decimal places. Block 850 provides that after the measurements are passed back to reading metrics engine 250, reading metrics engine 250 computes a font size and line height. Block 860 provides that the user sees the page on any viewing surface with type that is appropriately sized and spaced.

Figure 9A:
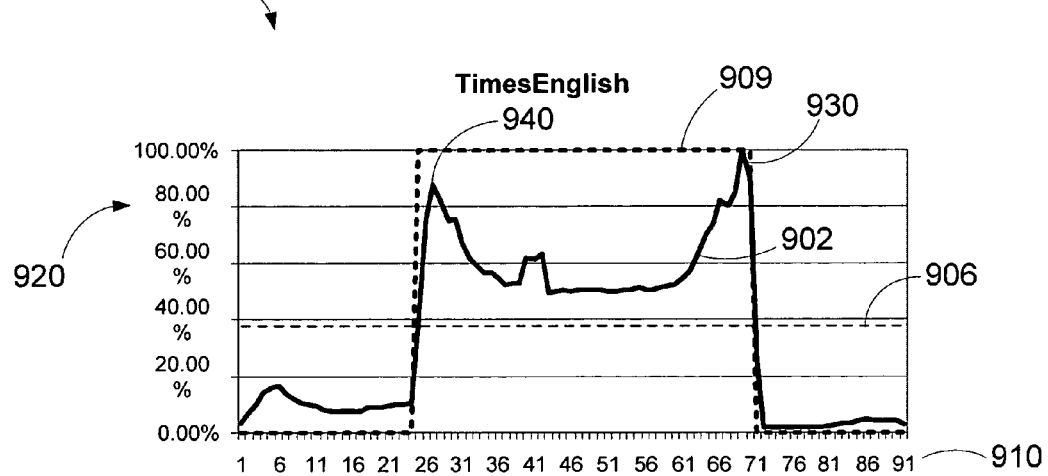
FIG. 9A illustrates a graph resulting from implementing a method for determining font characteristics in accordance with an embodiment of the present invention.

Referring now to FIG. 9A, a graph 900 illustrates a measured sample after text engine 250 computes measurements described in FIG. 8. The graph shows measurements of Times New Roman, such as a normalized version of the graphs shown in FIG. 7. The measurements shown include an average grayness of each row of pixels measured from 0 (black) to 255 (white). The graph 900 illustrates a normalized version showing the grayness as a percentage. The raw data is normalized in graph 900 so that the darkest line of the type is treated as absolute black or 100% and the lightest pixel is 0%. More specifically, graph 900 shows the height of the representative line of text along the X-axis 910 in points and the average grayness of each row of pixels along the Y-axis 920 as a percentage. The normalized measurements are shown in solid line 902, the absolute measurements of the channel and shallows are shown as dashed line 909, and a median value for the grayness is shown as line 906. A comparison of graph 710 shown in FIG. 7 with graph 900 shows alignment points 930 and 940, and also shows a channel delineated by the x-height 940 and baseline 930 in this font and language. The intersection of line 906 with type curve 902 is at data point 24, and a next intersection is at data point 71. The total height of the font is 91. For an em block of 100, a set of real numbers relative to an em would be: before shallows =0.24; channel =0.45; after shallows =0.20; and black river =0.91.

Figure 9B:
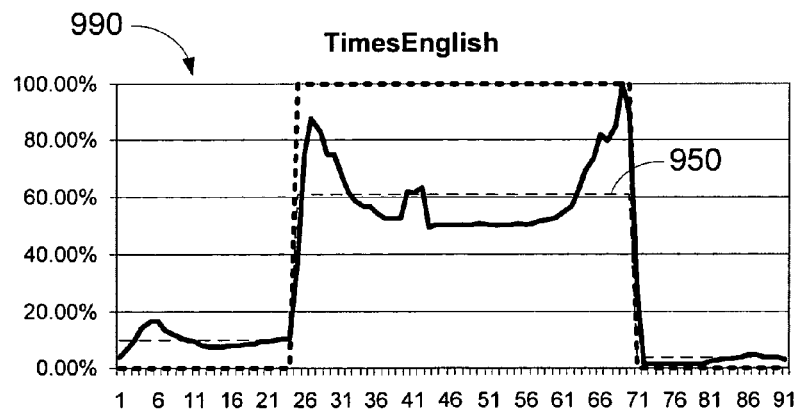
FIG. 9B illustrates another graph resulting from implementing a method for determining font characteristics in accordance with an embodiment of the present invention.

FIG. 9B illustrates graph 990 with the same type curve 902 with dashed line 950 indicating an average depth of each of the shallows and the channel. Average depth values as a percentage can be used to determine the amount of line height. The values returned can include a before shallows average depth of 0.099; channel average depth of 0.61; and an after shallows average depth of 0.038.

The measurements from text engine 250 are returned to reading metrics engine 240. Reading metrics engine 240 uses the measurements for a variety of purposes.

One function of the reading metrics engine 240 is to determine a default font size for readable text in any language. Prior art default font sizes use hardwired numbers in points or pixels based on the font sizes of Elite and Pica type on typewriters, such as 12 pitch or 10 point, and 10 pitch or 12 point. Reading metrics engine 240 takes a new approach by determining an appropriate size for text in any given language or script type, based on the reading characteristics of the language and culture, and the physical rendered characteristics of the font as determined via text engine 250 and environmental factors. Reading metrics engine 240 can be automatic and scalable and can use culturally specific inputs and user adjustable inputs.

More particularly, reading metrics engine 240 applies a method according to an embodiment that determines font size as a function of characteristics related to a viewing medium and characteristics of the language. The characteristics of the viewing medium include determining a default distance from a viewing medium, which can be altered by user input as necessary.

Figure 10:
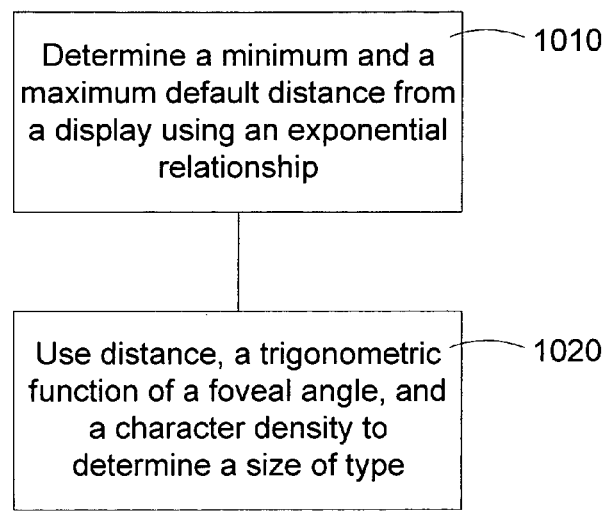
FIG. 10 is a flow diagram illustrating a method for determining font size in accordance with an embodiment of the present invention.
Figure 11:
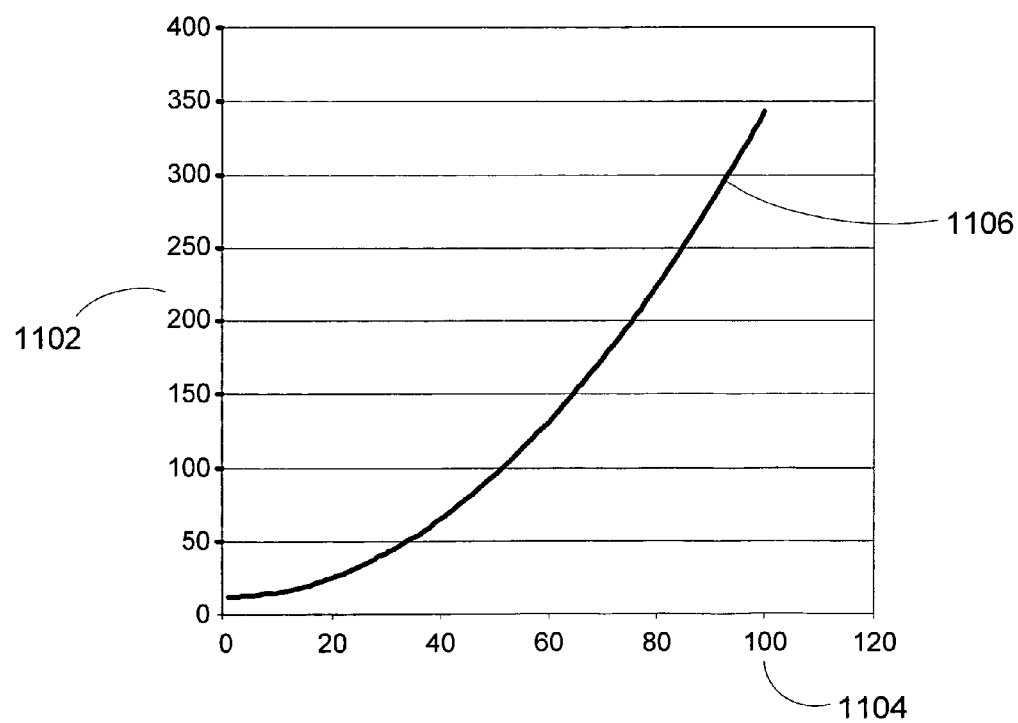
FIG. 11 is a graph illustrating a curve appropriate for determining text characteristics in relation to viewing distance in accordance with an embodiment of the present invention.

Referring to FIG. 10, a flow diagram illustrates a method for computing a font size at a default distance from a display. The method determines in block 1010 a minimum and maximum default distance from a display that uses an exponential relationship of a minimum distance from any display. In one embodiment, a minimum distance is set as 12" and a maximum distance is set to approximately 27". The exponential curve accelerates rapidly to greater distances as the display gets larger. The function 'ad²+b=D' is an exemplary exponential function appropriate for determining a default distance. In the function 'a' represents a constant multiplier of 'd²' and 'b' represents a constant number added to 'ad²' such that 'a+b=12', or the minimum distance that a reader might view a page of type. 'D' and 'd' are observable points on a graph of actual reading distance and display sizes. Lowercase letter 'd' represents the diagonal of the display surface in inches; and 'D' represents the distance from the display surface in inches. In an example, if 'a' and 'b' have been solved with a=0.02353 and 'b'=11.97647, and the points are converted by multiplying by 72, an exponential curve 1106 is given as shown in the graph of FIG. 11. As shown, the x-axis 1104 represents the diagonal of the display in generic terms and y-axis 1102 is the distance from the display in generic terms. Although the graph in FIG. 11 shows inches, if the example were converted to another unit, a similar conversion of the 'a' and 'b' constants would also have to be made.

After the default display distance is determined, the distance is used by reading metrics engine 240 to determine a default size for type in a predetermined font. More specifically, block 1020 provides for using a trigonometric function of a foveal angle and a character density to determine the size of type for a predetermined font that is appropriate for reading in an environment. As used herein, the size of type for a predetermined font is referred to as a font size. A foveal angle is used to determine a sharpest focusable area on a viewing medium. To determine this area, the function uses twice the tangent of half of a foveal angle multiplied by the distance from the viewing surface. In an alternate embodiment, the foveal angle used to determine the distance is determined by one or more of an input of a reader specific foveal angle or a standard foveal angle of approximately 0.75 degrees. The reader specific foveal angle can reflect the reader's visual acuity. For example, the reader specific foveal angle can take into consideration one or more of macular degeneration, vision impairments, vision sharpness, tunnel vision, eye disease, near sightedness, far sightedness, dyslexia, and astigmatism.

Figure 12:
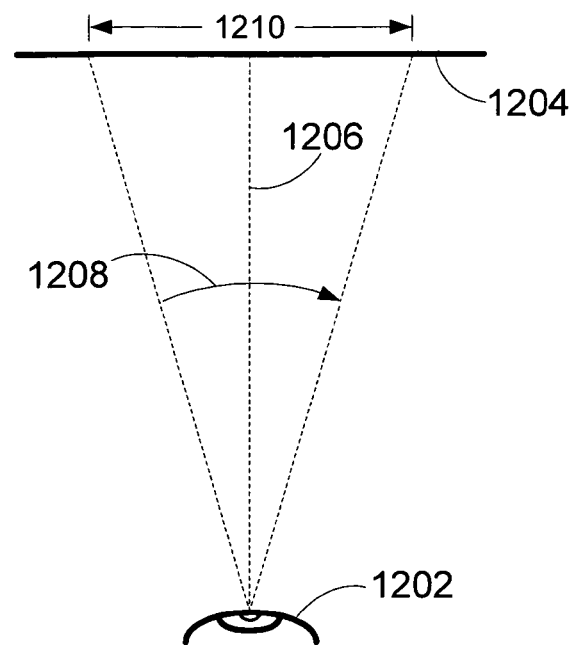
FIG. 12 is a graph that illustrates how a sharpest focusable area is determined in accordance with an embodiment of the present invention.
Figure 13:
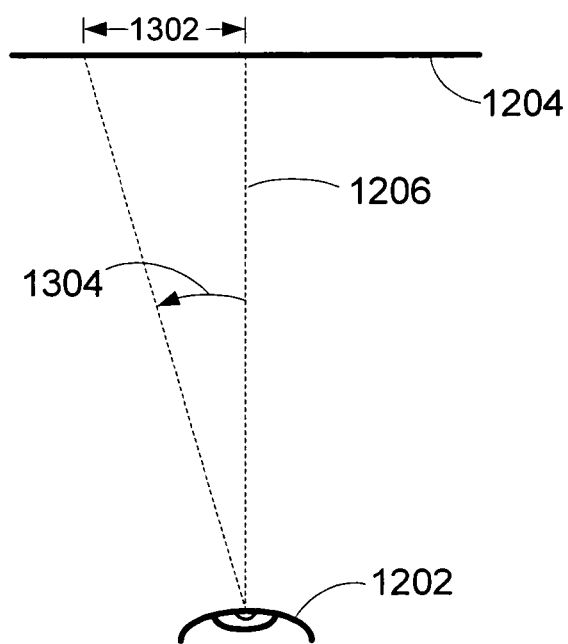
FIG. 13 is a graph that illustrates how trigonometric functions apply to determine a sharpest focusable area in accordance with an embodiment of the present invention.

To demonstrate foveal angles, FIGS. 12 and 13 are graphs that illustrate how the sharpest focusable area is determined. As shown, eye 1202 sees the viewing surface 1204 from a viewing distance 1206. Research of human eye abilities indicates that a 0.75-degree foveal angle 1208 is the maximum angle of sharpest focus of eye 1202. Demonstrating a method of determining the length 1210 of a sharpest focusable area is shown in FIG. 13. Using trigonometric functions, the length 1210 can be described as twice the tangent 1302 of half the foveal angle 1304. The foveal angle of the human eye, based on various studies is approximately 0.75°. The parafoveal angle is 10-12°. In addition to the range of vision in which data is perceptible, but not at the peak of focus, 12° is approximately the range of movement of the eye before involuntary movement of the head begins to assist the eye positioning. In one embodiment, an estimate of 16 foveal fixations in an optimum line length. The number of clusters is culturally defined. The research on English line length is well documented both by objective research and by observation of the evolution of book design. In English, research indicates approximately 4 characters of instantly identifiable type per foveal fixation. Thus, an embodiment uses an estimate of an optimum English line at 4×16=64 clusters per line. Observation shows that character sets that include more information per cluster than English require fewer clusters per fixation in order to speed comprehension. Because this is not an absolute relationship, one embodiment uses a table that indicates on a language-by-language basis how many clusters will be in each foveal fixation for that language. The table can be language by language or by language groups including but not limited to Roman, Arabic, Thai, Asian, and Indic. These groupings are made by the characteristics of the writing system. Any individual language may be shown to have a different or better optimum value.

Referring back to FIG. 10, block 1020 provides for using the character density to determine a font size. The character density can be determined by dividing the number of clusters per em by a number of clusters per fixation. The clusters per fixation for the language type is a constant associated with one of a plurality of languages, each of the plurality of languages having a constant representing an information density for reading in the language. A cluster per em is a description of graphic density. Therefore, character density can be described as a function of graphic density and information density of a character. In an embodiment, the graphic density and information density are language dependent, including reading characteristics of the language according to an amount of information per sharpest focused area viewable to a reader.

According to an embodiment, reading metrics engine 240 includes or has access to a linguistic table of clusters per foveal fixation. The maximum number of clusters comprehendible in a single foveal fixation could be determined by a language by language survey, generating a table, or could be entered by a user given access to reading metrics engine 240. Each language defines how many clusters you can see at a fraction, such as 1/16th, of a parafoveal angle. Therefore, every language has a determinable number of clusters per parafoveal angle. This value can be used to determine line length, column width and the like. In one embodiment, a number of clusters that can be viewed in a line length is assumed to be approximately ten for each language. The number of clusters determined for a language can be multiplied by a number that represents a comparative between alphabets. Alternatively, determining a number of clusters in a line and dividing the number of clusters by a constant representing the number of fixations of a human eye in that line of text determines the number of clusters per foveal fixation. The constant for one or more languages can be approximately 16. The number of clusters per fixation is multiplied by the number of foveal fixations in a parafoveal field and this provides an optimum number of clusters per readable line. A parafoveal angle is a wider angle than a foveal angle, and generally refers to an angle at which an eye can see a maximum focusable area. In an embodiment, a parafoveal angle is approximately 10 degrees. As discussed above, a foveal angle is approximately 0.75 degrees and relates to between two and four letters per foveal focus area. Using a constant for the number of fixations of a human eye in a line of text of 16, and multiplying by the number of clusters per foveal fixation, a number of clusters per line for each language can be determined as shown in Table 1.

TABLE 1

| Language | Clusters per fix ($C_{pf}$) | Fixations per line (16) | Clusters per line ($C_{pl}$) |
| --- | --- | --- | --- |
| English | 4 | 16 | 64 |
| French | 4 | 16 | 64 |
| German | 4 | 16 | 64 |
| Greek | 3.7 | 16 | 59.2 |
| Russian | 3.5 | 16 | 56 |
| Arabic | 4.4 | 16 | 70.4 |
| Japanese | 1.8 | 16 | 28.8 |
| Chinese | 1.8 | 16 | 28.8 |
| Korean | 2.2 | 16 | 35.2 |

Figure 14:
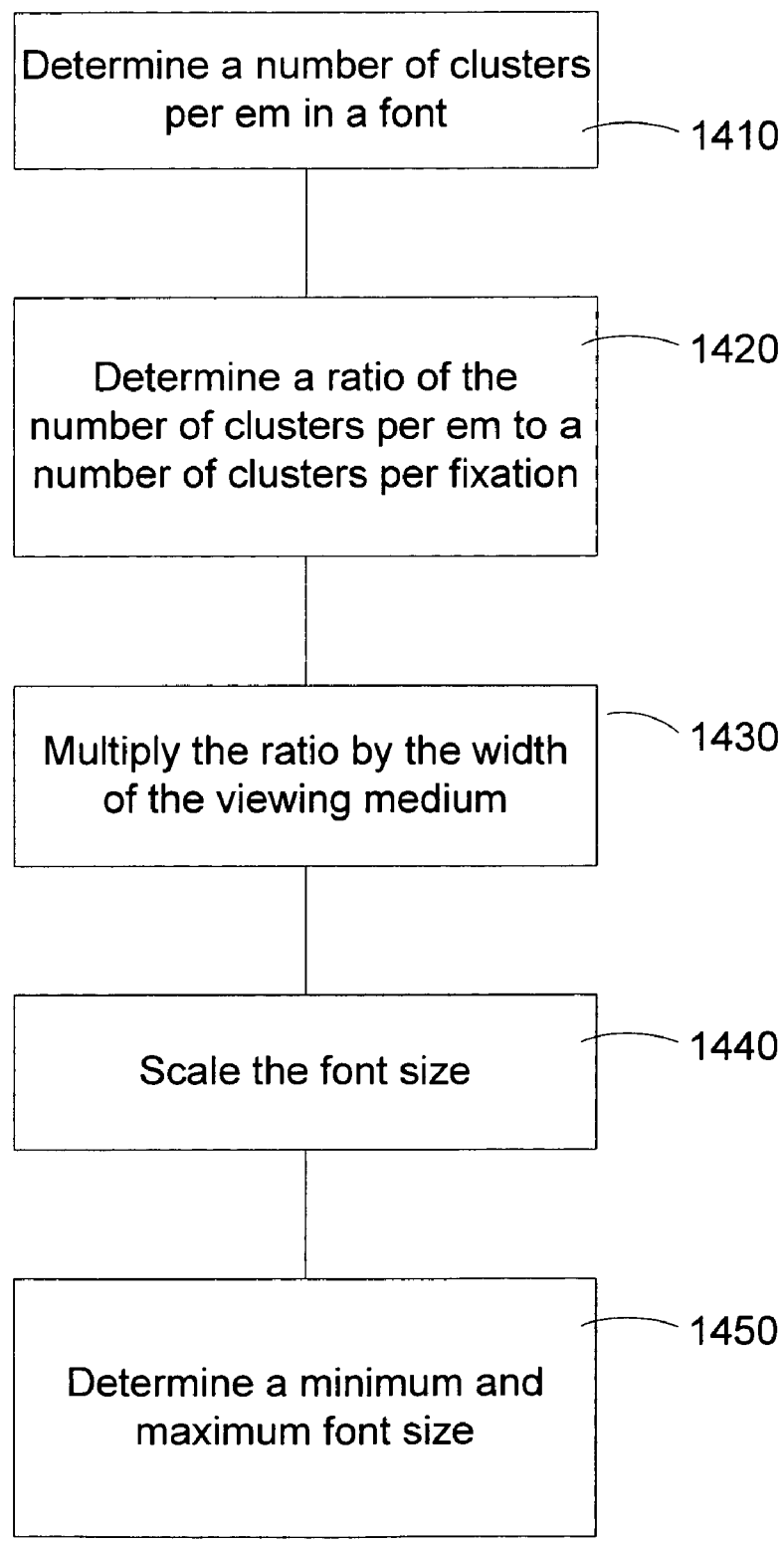
FIG. 14 is a flow diagram illustrating a method for automatically determining a minimum and maximum font size in accordance with an embodiment of the present invention.

Referring to FIG. 14, a method of determining a character density includes in block 1410, determining a number of clusters per em in a font. In an exemplary embodiment, the number of clusters per em is derived from text engine 250. Block 1420 determines a ratio of the number of clusters per em in the font to a number of visible clusters within a predetermined foveal angle, hereinafter referred to as clusters per fixation. As described above, the number of clusters per fixation can be derived or be retrieved from a source such as Table 1 and is different for each font in each language. Block 1430 provides for multiplying the ratio of number of clusters per em to the number of clusters per fixation by the width of the viewing medium in points to obtain an optimum point size for the font family at a given viewing distance. Block 1440 provides for optionally scaling the obtained font size according to a markup input by a user or other source. Block 1450 provides for determining a minimum font size and a maximum font size. More particularly, in one embodiment a minimum font size is based on the maximum number of clusters that a user can comprehend in a single foveal fixation. A maximum font size is based on the minimum number of clusters that a user can comprehend in a single foveal fixation and still make sense out of the line of type. In an alternate embodiment, a minimum and a maximum font size can be determined based a predetermined percentage of the optimum font size, for example, ±25% of the table value for clusters per fixation ($C_{pf}$). This translates into a minimum font size that is 0.8 multiplied by the optimum font size and a maximum font size that is 1.33 multiplied by the optimum font size. In another alternate embodiment, a minimum font size may be determined by the rendering engine based on the output resolution and the minimum number of pixels required to successfully render the font with integrity.

Figure 15:
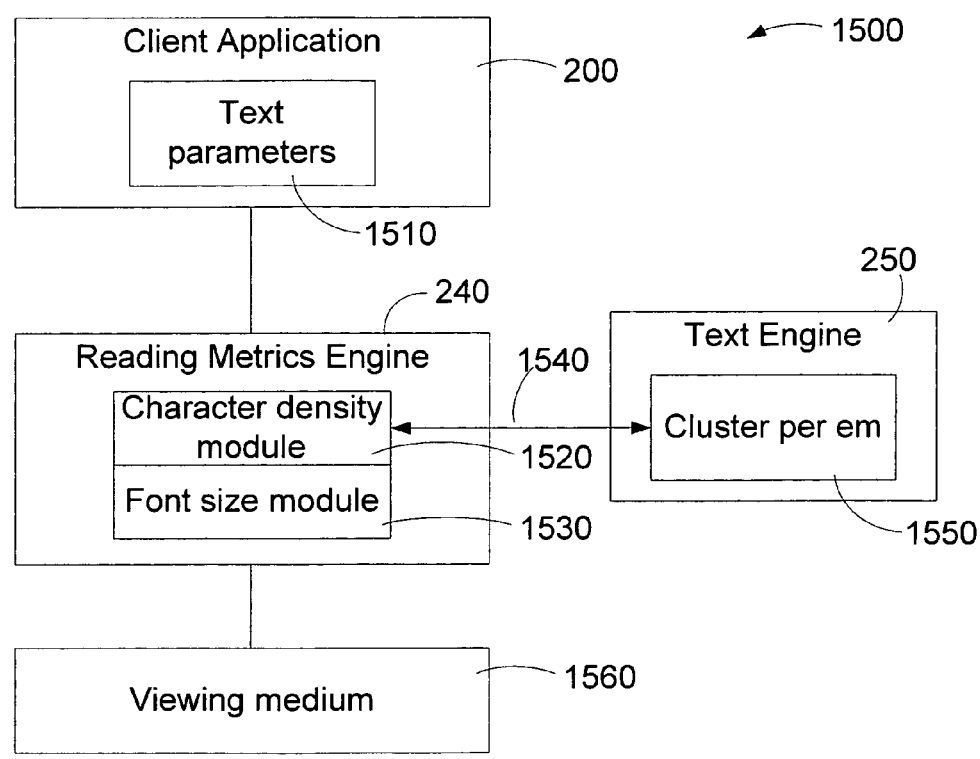
FIG. 15 is a block diagram illustrating data flow used to determine a font size in accordance with an embodiment of the present invention.

Referring now to FIG. 15, a system 1500 for adjusting text in a font for optimal readability on a viewing medium is shown. The system includes a client application 200 including a data structure holding one or more text parameters 1510. The system further includes reading metrics engine 240 coupled to the client application 200, reading metrics engine 240 being configured to receive the one or more parameters of the text 1510. Reading metrics engine 240 includes a module configured to determine a character density for the font (character density module 1520), and a module configured to multiply the character density by a sharpest focus area of an eye to produce an optimal size of the font for readability (font size module 1530). The character density module 1520 is shown coupled via an API 1540 to text engine 250 to retrieve clusters per em 1550 for the font. The character density is computed by dividing the clusters per em by the clusters per fixation. In one embodiment, reading metrics engine 240 further includes a module configured to determine an optimum column width via a function of the optimal size of the font, a number of clusters per fixation for a language type, a number of clusters per em and a distance from the viewing medium. System 1500 further includes a rendering device for a viewing medium 1560, the viewing medium can be a printed page, a computer screen, a personal digital assistant, a holographic image, a billboard, movie screen, an insert in a pair of glasses or the like.

By means of example, if the language is English (Clusters per Fixation of 4.0), and the distance from the monitor is 1368 points (19 inches), and the Font is Times New Roman (2.58 Clusters per em), then the optimum type size for clear readability is given by 2×Tangent 0.006544×1368×2.58/4.0=11.5 point type. For a different font, Linotype Palatino, which has only 2.33 Clusters per em, the optimum type size is given by 2×Tangent 0.006544×1368×2.33/4.0=10.4 point type.

A different language and script form would yield significantly different results. For example, Arabic Times New Roman. The cultural measurement of Clusters per Fixation is 4.4 rather than 4.0, and the number of clusters per em is 2.97. Therefore, the optimum readable type size for Times New Roman in Arabic is 2×Tangent 0.006544×1368×2.97/4.4=12.1 point type.

Although a value for the clusters per fixation must be determined for each language group, the formula leaves itself open for accessibility adjustments for tunnel vision, distance from the viewing surface, and other visual impairments. These would act on the inputs to the formula to change the extracted default value. Some of these special adjustments can also be automated to assist in fitting text to different viewing conditions, like multiple columns, small devices, and large screen, high resolution monitors. In an alternate embodiment, the parafoveal angle, the foveal angle and the character density can be altered according to user inputs to assist handicapped users, impaired users, or users with more acute vision. A narrower parafoveal angle relates to a tunnel visioned user. A wider parafoveal angle relates to a user with acute peripheral vision. A narrower foveal angle relates to a user with macular degeneration.

Figure 16:
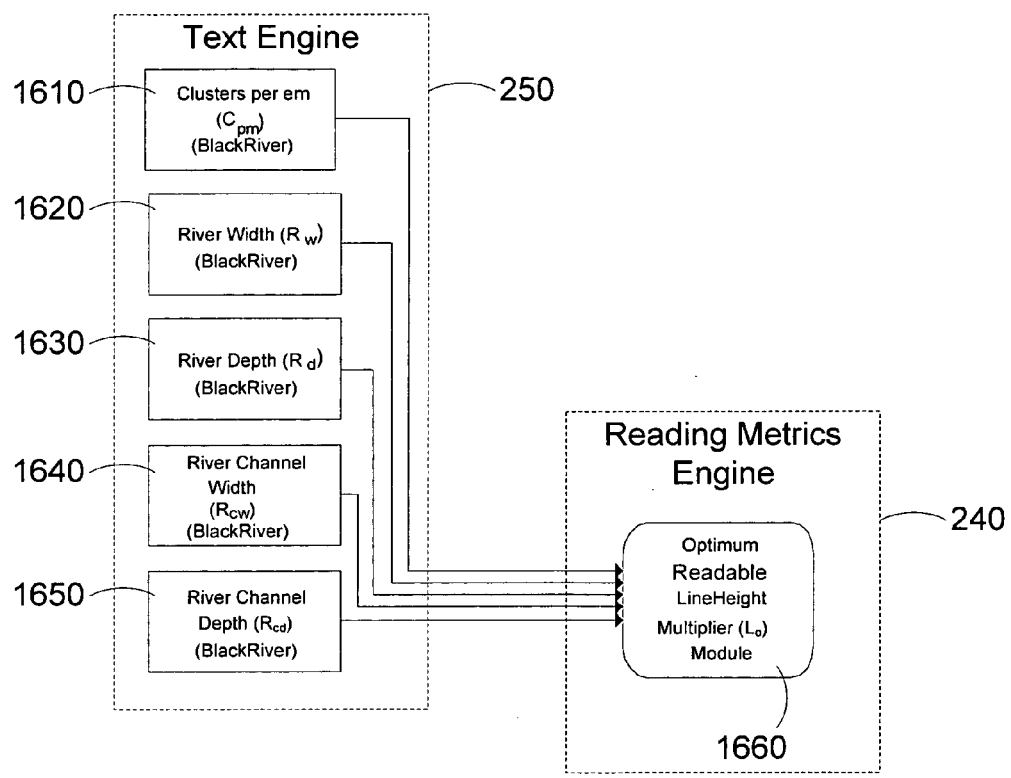
FIG. 16 is a block diagram illustrating data flow used to determine text characteristics in accordance with an embodiment of the present invention.

Referring now to FIG. 16 in combination with FIGS. 7 and 8, block 850 of FIG. 8 provides for computing font size and line height. As is known in the art, line height requirements change depending on the lengths of a line and for different type sizes. Even for a same font size, the line height requirements change depending on the number of columns per page. According to embodiments herein, line height is determined with different methods, depending on available information. In one embodiment, after a type size is determined as discussed above, a line height for that size type is determined. That line height can then be manipulated based on the number of clusters in a line, the line length and the like.

One method for computing line height is described with reference to FIG. 16. As shown, reading metrics engine 240 receives a plurality of calculations relating to the grayness of a given font in a given language from text engine 250. Those calculations include clusters per em 1610, river width 1620, river depth 1630, channel width 1640 and channel depth 1650. Within reading metrics engine 240, an optimum readable line height multiplier module 1660 calculates a line height.

Figure 17:
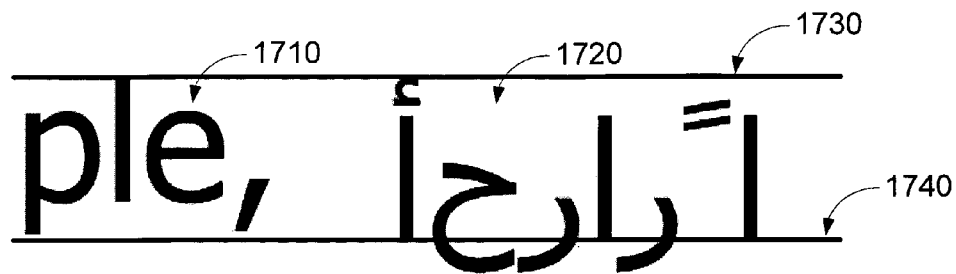
FIG. 17 illustrates an example of a same font in different languages showing a width variance in accordance with an embodiment of the present invention.

More particularly, an embodiment is directed to computing line height based on the relationship of the contrast between the overall river and channel for text in a font with the character density of the font. The five outputs from text engine 250 that are useful to determine line height, (e.g. 1610, 1620, 1630, 1640 and 1650) are described in further detail. The first is the River Width 1620. The River Width ($R_w$) is measured from the top-most ink in the font to the bottom-most ink in the font as a multiplier of the em-square. The River Width is not usually the same as the em-square as most Latin and Asian fonts have significantly less River Width than the em-square and most Arabic and Thai fonts have significantly more River Width than the em-square. For example, referring to FIG. 17, a rendering of English Tahoma 1710 is shown next to Arabic Tahoma 1720. The font size for an em in Tahoma is shown as between lines 1730 and 1740. The illustration shows that English Tahoma is smaller than the em, and Arabic Tahoma on the right is considerably larger than the em.

Referring back to FIG. 16, a normalized River Depth ($R_d$) 1630 relates to calculations within text engine 250 that are normalized to the darkest row of pixels in the representative line of measured text as described above in FIG. 8. All expressions of depth can be relative to the darkest row of pixels. Depth is the average black and represents a total ratio of the pixels in a given span of text. $R_w \times R_d$ provides a total gray value of the river.

The gray value of the channel is computed using the same formula but based on the River Channel Width (RCw) and the River Channel Depth ($RC_d$). By dividing the Gray Value of the Channel by the Total Gray Value of the River, the degree of contrast between the Channel and the rest of the River is provided.

The optimum readable line height is determined by the optimum readable line height multiplier module 1660 by dividing the ratio of the Channel Gray Value to the Total Gray Value by the character density of the font ($C_{pm}$) to yield a fraction of the font size that should be added to the font size for a line height. By adding 1 to this number, the system generates an optimum line height (LO) as a multiplier of the font size. The following equation summarizes actions within optimum readable line height multiplier module:

$$(1+((RC_w \times RC_d)/(R_w \times R_d)/C_{pm})) \times L\Delta = LO.$$

In one embodiment, the line height is multiplied by a Markup Line Height Scale (LΔ) before the Optimum Line-Height is finalized.

In another embodiment, the calculations from text engine 250 include $B_h$=Before Shallow Width; $B_d$=Before Shallow Depth; $A_h$=After Shallow Width; $A_d$=After Shallow Depth;

$RC_w$=Channel Width; $RC_d$=Channel Depth; $C_{pm}$=Clusters per em; FS =Default Font Size, and the following equation is determined within optimum readable line height multiplier module 1660 to calculate a line height:

$$FS/(((B_h \times B_d)+(A_h \times A_d)+(RC_w \times RC_d)) \times C_{pm}) = \text{Line Height}.$$

In other words, the sum of the widths multiplied by the depths for the three portions of the river multiplied by the number of clusters per em, divided into the font size provides a line height. Thus, ten point Times New Roman would be computed at:

$$10/(((0.24 \times 0.09)+(0.45 \times 0.6)+(0.22 \times 0.04)) \times 2.58) = 10/(0.0216+0.27 \times 0.0088) \times 2.58 = 10/0.775032 = 12.9.$$

A simpler version of the same method uses the following formula:

$$FS/(R_d \times R_w \times C_{pm}) = L.$$

Figure 18:
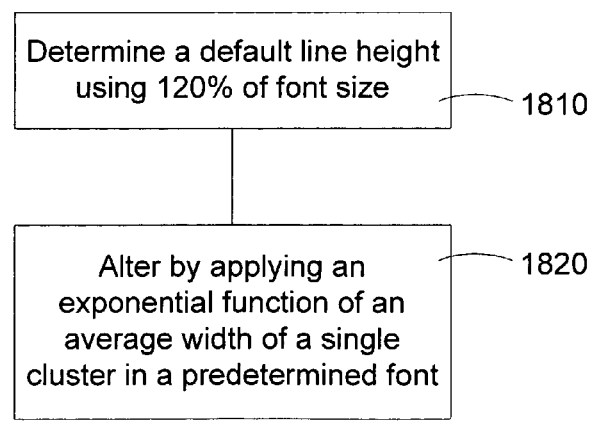
FIG. 18 is a flow diagram illustrating a method for automatically scaling a font size in accordance with an embodiment of the present invention.

In other embodiments, a typical line height adjustment used for English text of 120% of the text height is used to globalize the line height for other languages. Using this known 120%, another method of determining line height is described in FIG. 18. In block 1810, a default line height is determined by taking 120% of a font size. In block 1820, the default line height is altered by applying an exponential function of an average width of a single cluster in a predetermined font. More particularly, the function can be the square root of the sum of an average width of any single cluster in any font and the square of actual height of the type. The actual height and the width of any cluster can be determined in text engine 250 for any international font. One embodiment uses the following equation:

$$1.2FS(R_w^2+(1/C_{pm}^2))^{1/2},$$

which is an exponential function having FS as the size of default type; 1.2 as a user input or standard default line height multiplier; $R_w$ as the actual height of the type from its top ink to its bottom ink per em; and $C_{pm}$ as the number of Clusters per em.

As an example, with a default font of 10 points, the following computed line height:

$$10 \times 1.2 \times (0.912+\tfrac{1}{2}.582^2)^{1/2} = 12 \times 0.9891 = 11.9.$$

Hence, the optimum line height for Times New Roman 10 point would be 11.9 points. The same formula, however, when applied to 10 point Linotype Palatino font which has an inked height of 1.01 per em and 2.33 Clusters per em would result in an optimum line height of 13.2 points.

Figure 19:
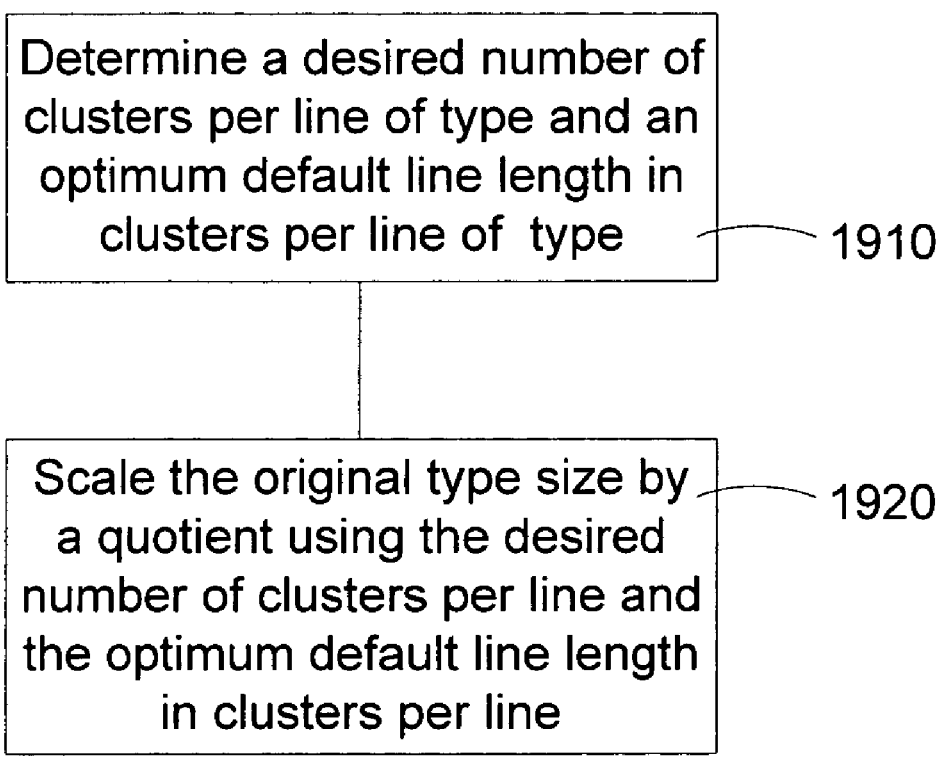
FIG. 19 is a flow diagram illustrating a method for adjusting line height based on a function of the number of clusters in a line in accordance with an embodiment of the present invention.
Figure 22A:
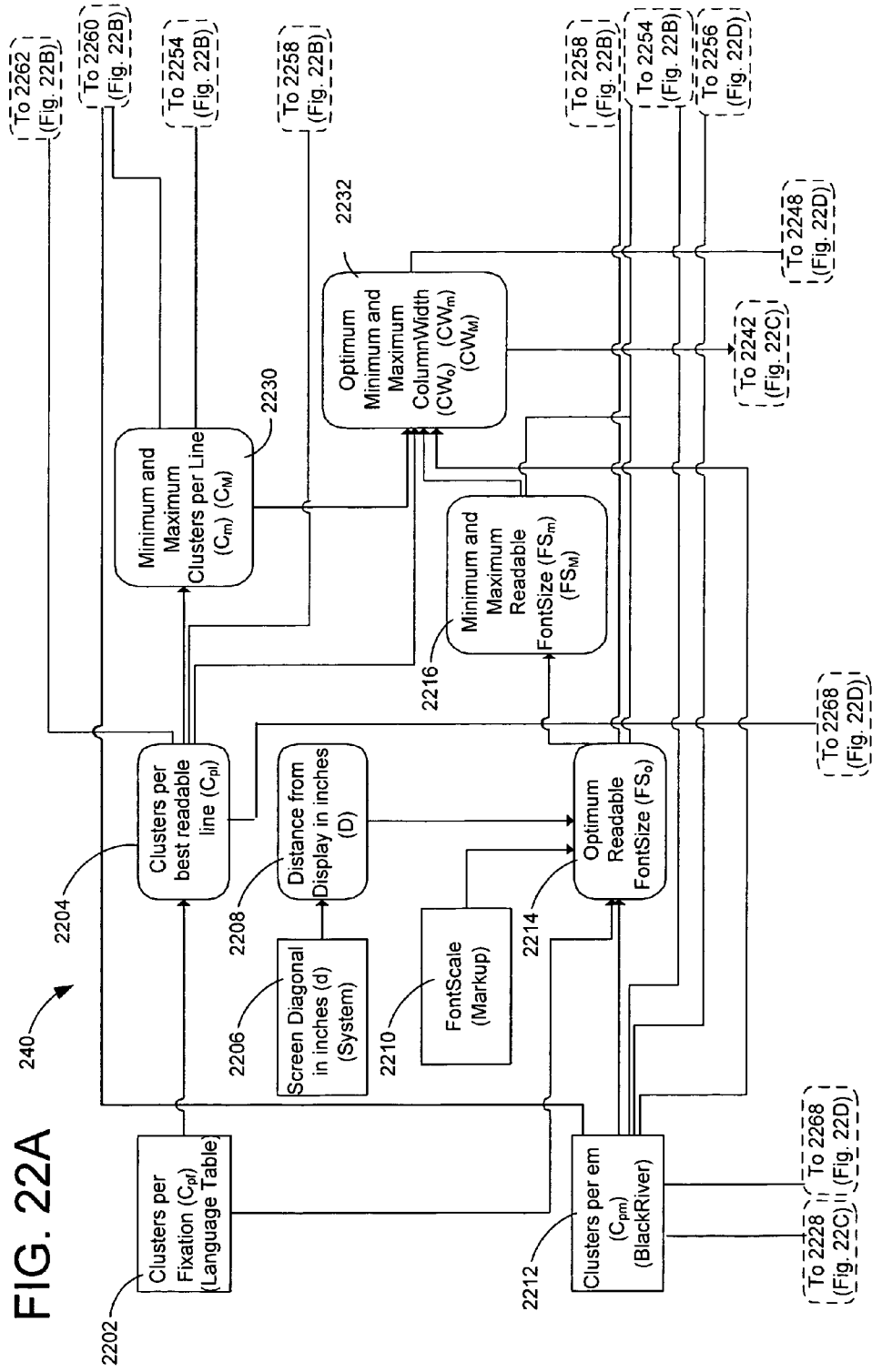
FIGS. 22A-22D represent a block diagram illustrating data flow within a reading metrics engine in accordance with an embodiment of the present invention.
Figure 22B:
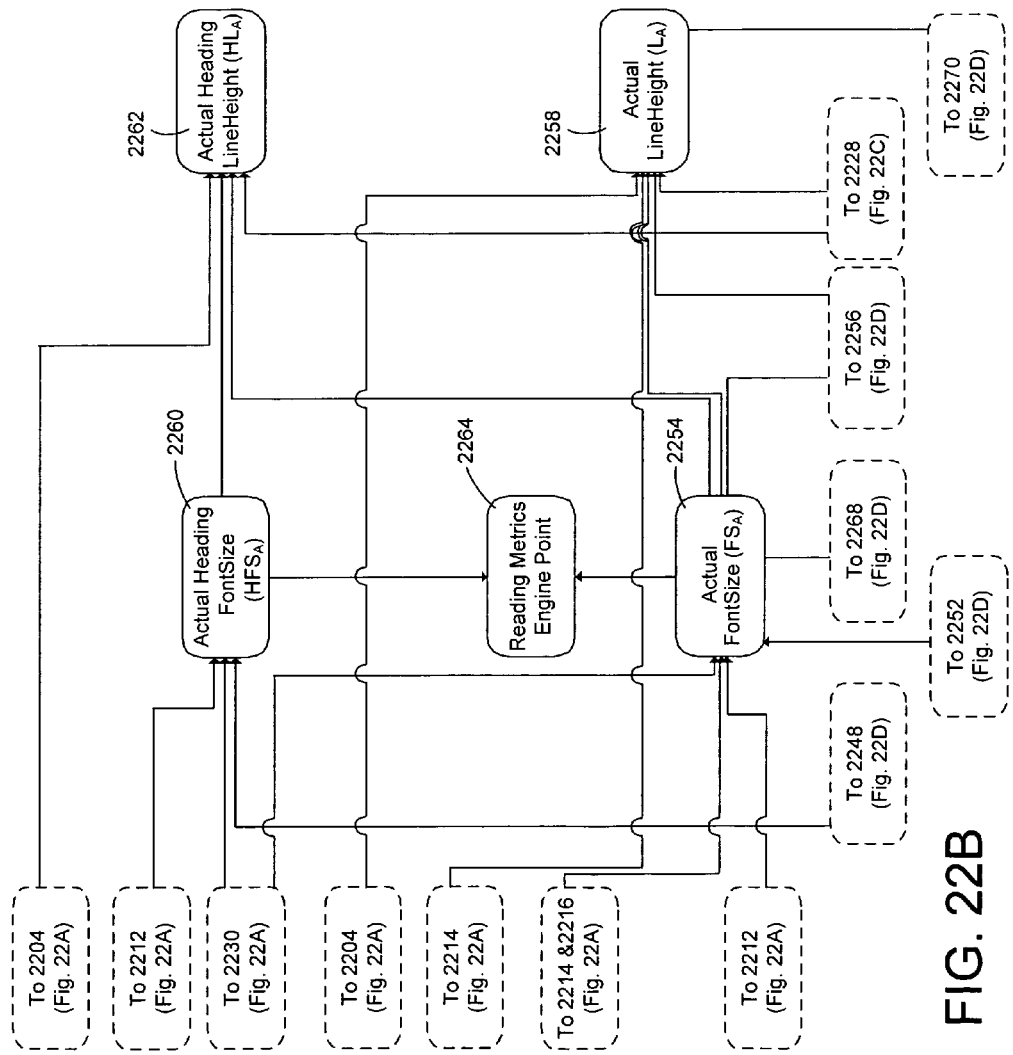
Figure 22C:
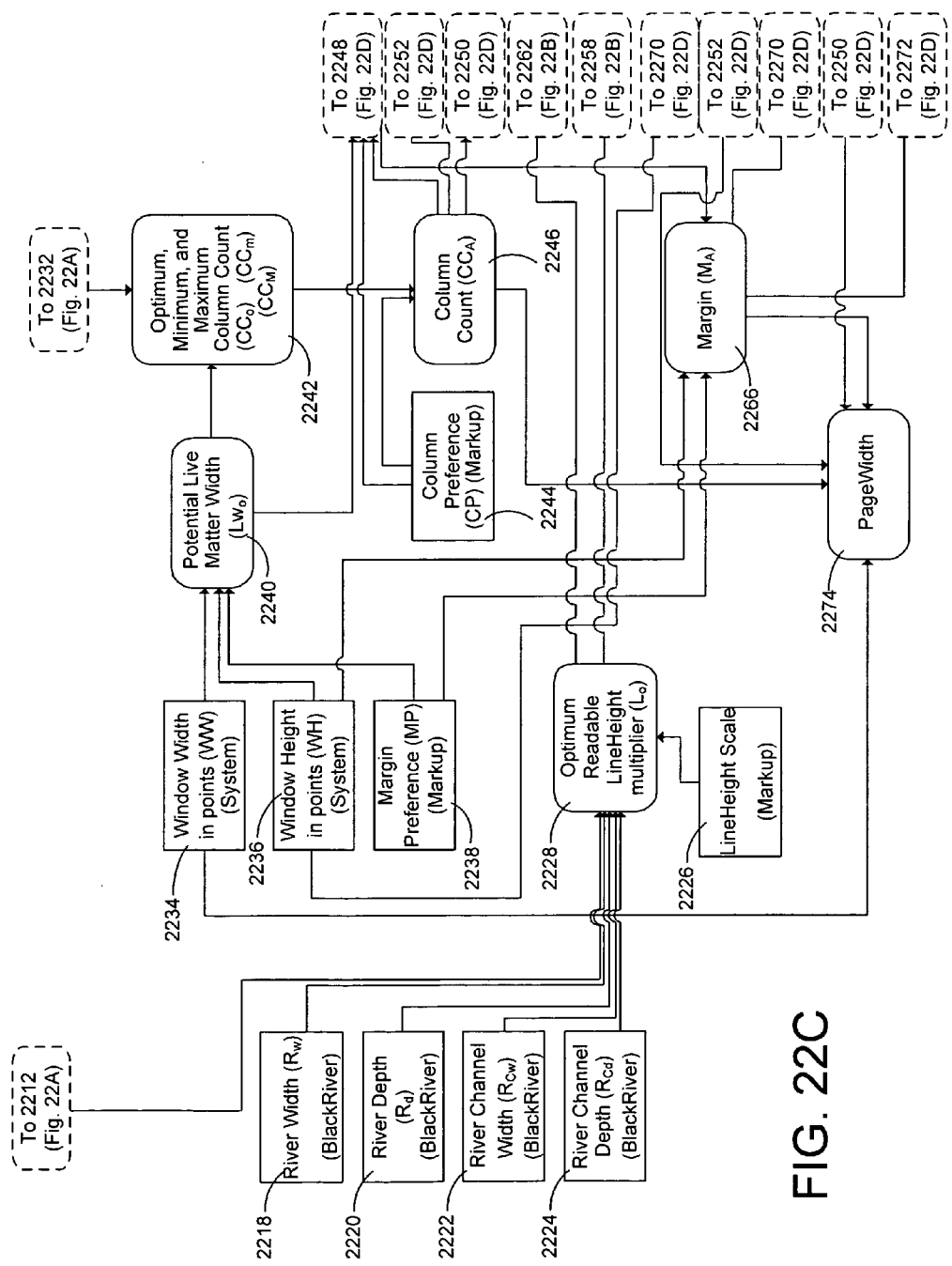
Figure 22D:
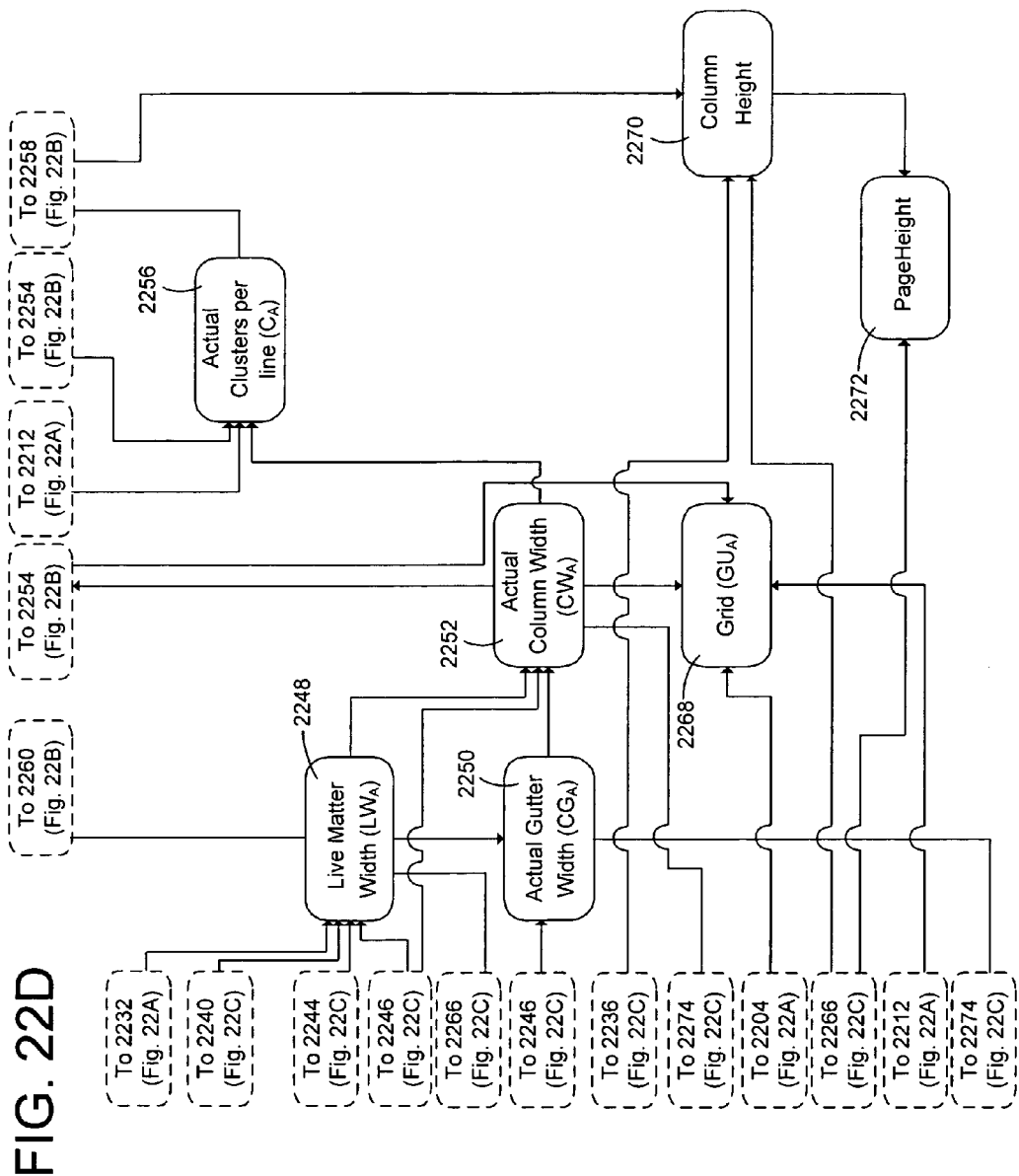

In another embodiment, the line height is altered if the line length increases. Referring to FIG. 19, a flow diagram illustrates adjusting line height based on a function of the physical length of the line of text or the number of clusters in a line. Block 1910 provides for determining a desired number of clusters per line of type and an optimum default line length in clusters per line of type. Block 1920 provides for scaling the original type size by a quotient using the desired number of clusters per line and optimum default line length in clusters per line.

Once a line height is determined according to a font size, changing the font size will alter the line height. If a font size is made larger, finding the line height is not a linear relationship. In one embodiment, the alteration in the line height for a change in font size can be found by applying a function with an exponential relationship. The exponential function can include consideration of the number of clusters per em. An original type size is known and the line height for that type size is known. There is a bounding for type size changes that are larger. The line height cannot be smaller than the type itself. Therefore, referring to FIG. 20, a graph 2000 illustrates the empirically found line height possibilities for a given font size in points. The x-axis 2002 represents a font size in points; the y-axis 2004 represents a line length in points. A 45 degree line 2010 illustrates a line height that is equal to the font size. As font size increases, the size of the line height does not follow a linear relationship. Rather, as font size increases, the line height required decreases as shown by line 2020. In an embodiment, an automatic method of determining line height uses an exponential function. The function uses the variable clusters per em. In particular, it has been discovered that a power function can be used that uses the power of a constant ranging between 1.02 and 1.07. Further, it has been discovered that a constant that is usable for all types may be 1.047. This constant is approximately equal to pi over 3. Another variable relates to backward compatibility. If a 20% line height for 30 point type is applied, another font size must relate and give a same line height for the same font size, regardless of where the method begins.

Referring now to FIG. 21, a flow diagram illustrates a method for determining font size. Block 2110 provides for determining an appropriate default specification for line height relative to a predetermined readable line length and font size. Block 2120 provides for determining any changes to a value for the font size that are brought about by the font size being different than the specified default. As is known, larger type requires less line height as a factor of the font size. Prior art methods require designers to make an adjustment by eye. If the type appears tight, designers add line space. If the type appears loose, designers subtract line space. Block 2130 provides for automatically determining a new line height via determining a difference between an optimum default font size and an actual font size. Block 2140, adjusts the line height by a constant raised to a power of the difference in font size. An equation:

$$(1.047^{(FSO-FSA)} \times (L_O/FS_O-1)) \times FS_A = LA$$

represents one embodiment for determining a new line height according to the method. In the equation, $FS_O$ represents an original default font size; $FS_A$ represents a new font size; $L_O$ represents an original default line height; and $L_A$ represents a new line height.

By way of example, to find the new Line Height for Times New Roman at 14 point Font Size, its default could be determined according to a method described above with 10 point Font Size and 12.9 point Line Height, and the equation would provide as follows:

$$(1.047^{(10-14)} \times (12.9/10-1)+1) \times 14 = ((1.047^{-4} \times 0.29)+1) \times 14 = ((0.8321 \times 0.29)+1) \times 14 = 1.2413 \times 14 = 17.38.$$

Reading Metrics Engine Flow

Referring now to FIGS. 22A-22D, a flow diagram illustrates how reading metrics engine 240 operates on inputs and how each calculated measurement is shared to determine other measurements. FIGS. 22A-22D illustrate how embodiments described above fit into an overall system of reading metrics engine 240.

Block 2202 represents inputs from a 'clusters per fixation language table' or other source. Block 2202 flows to block 2204, which outputs a 'clusters per best readable line'. The calculations can be according Table 1.

Block 2206 represents an input from a computer system providing a value for the size of a viewing medium, such as a screen diagonal. Block 2208 represents calculations for determining a default distance from the viewing medium. One method for determining a default distance is described above with reference to FIG. 10. Block 2210 provides for an input "Font Scale" which can be input by a user or via a markup page. Such markup could resemble <Element FontScale="1.2">Element content.</Element>.

Block 2210, 2212, 2208 and 2202 each provide inputs for calculating an optimum readable font size. Block 2214 represents calculating the optimum readable font size. As discussed above, finding an optimum font size includes first determining a horizontal surface area on a viewing medium within a predetermined foveal angle at a predetermined distance, and determining the size type according to a number of clusters per fixation appropriate for a given language and font. In one embodiment, the font scale 2210 provides a multiplier for determining a font size.

Block 2214 provides an input for block 2216, which provides for determining a minimum and a maximum font size. In one embodiment the minimum and maximum font size is based on a 25% deviation from an optimum font size, or 0.8 multiplied by a predetermined font size for a minimum font size or 1.33 multiplied by the predetermined font size for a maximum font size. In another embodiment, a maximum number of clusters comprehendible in a single foveal fixation determines a minimum font size and a maximum font size for a given language.

Blocks 2218, 2220, 2222, 2224 can represent outputs from text engine 250 that provide inputs for determining an optimum readable line height multiplier 2228 as described above with reference to FIG. 15. In one embodiment, block 2228 receives a line height scale input 2226 from markup or user input such as <Element LineHeightScale="1.5">Element content.</Element>.

Block 2230 provides for determining a minimum and a maximum number of clusters per line. The minimum and maximum line lengths assist column preference options that can be input by a user. In one embodiment, a column preference of low provides an optimum readable line length in clusters for immersive reading. Medium, High, and Maximum column preference options provide for progressively shorter lines with fewer clusters. A column preference of Single expands a line length in clusters beyond an immersive reading standard.

In one embodiment, the increments are uniform, ranging from one-half the optimum clusters per line up to 1.167 times the optimum. To determine minimum line length in clusters ($C_m$) and the maximum line length in clusters ($C_M$), the following equations apply:

$$C_m = 0.5 \times C_{pl}; C_M = 1.167 \times C_{pl}$$

The minimum and maximum clusters per line 2230, along with the number of clusters per best readable line 2204, minimum and maximum readable font size 2216 and the number of clusters per em 2212 are inputs for block 2232, where an optimum minimum and maximum column width is determined.

The minimum column width can be determined by computing a minimum font size and multiplying the minimum font size by a fewest number of clusters allowed on a line. The following equations determine optimal, minimal, and maximum column widths, respectively:

$$CW_O = FS_O \div C_{pm} \times C_{pl} \text{(clusters per best readable line)};$$

$$CW_m = FS_m \div C_{pm} \times C_m \text{(minimum clusters per best readable line)}$$

$$CW_M = FS_M \div C_{pm} \times C_M \text{(maximum clusters per best readable line)}.$$

A precursor to determining an optimum, minimum and maximum column count 2242, reading metrics engine 240 first determines a potential live matter width 2240. The live matter area is a layout area that lies inside a page's margins. The potential live matter area is the difference between the size of the window and a user-defined margin preference. The margins are computed based on the shortest dimension of the page. Therefore, an evaluation step is first to determine whether the vertical dimension or the horizontal dimension of the page is shortest. The amount of margin requested in the markup is then subtracted from the shortest dimension. The result is the live matter area. The inputs for determining potential live matter width include window width (WW) 2234, window height (WH) 2236, and user margin preference (MP) 2238. Thus, to determine the width of the potential live matter area ($LW_O$), the markup MarginPreference (MP) is subtracted from the WindowWidth (in points) and multiplied by the shortest dimension of the Window:

$$WW - (\text{minimum}(WW, WH) \times MP \times 2).$$

The potential live matter 2240 and the optimum, minimum and maximum column width ($CW_O$; $CW_m$ and $CW_M$; respectively) 2232 provide inputs to determine an optimum, minimum and maximum column count ($CC_O$; $CC_m$ and $CC_M$ respectively) 2242. In one embodiment, to determine the column count, an equation computes the number of columns of each of the widths that can fit in the potential live matter width. The output provides a range of minimum, maximum, and optimum number of columns that will fit on the page. The possible column count (CC) can be computed for the minimum, maximum, and optimum column width by dividing the column widths into the potential live matter width. The following equations apply to determine optimum, minimum and maximum column counts:

$$CC_O = LW_O \div CW_O; CC_m = LW_O \div CW_M;$$
$$CC_M = LW_O \div CW_m.$$

Referring to blocks 2244 and 2246, after column counts are determined, reading metrics engine 240 uses the counts and a user input column preference to determine an actual number of preferred columns.

The actual number computation is necessary because the equations of block 2242 do not yield a whole number of columns. In block 2242, an actual number of columns requested through column preference 2244 is rounded to the appropriate whole column ($CC_A$). In one embodiment, block 2246 is evaluative. If the Column Preference="Single" ("0"), then $CC_A$ will automatically equal 1. If the ColumnPreference="Low" ("1"), then the $CC_A$ will be rounded from the $CC_O$.

If the ColumnPreference (CP)="Medium |High" ("2 | 13"), then the $CC_A$ must be computed.

If the ColumnPreference (CP)="Maximum" ("4"), then the $CC_A$ will be rounded from the $CC_M$.

The Medium and High computations will be one-third and two-thirds between Optimum and Maximum. Therefore, $CC_A$ can be rounded from:

$$((CC_M - CC_O) \div 3) + CC_O \text{(Medium)}$$

$$(((CC_M - CC_O) \div 3) \times 2) + CC_O \text{(High)}$$

The following pseudocode demonstrates operation of block 2246:

```
IF CP=0
    THEN CC_A=1
    ELSE CC_A=(((CC_M-CC_O)/3)×(CP-1))+CC_O).
```

Rounding for a whole number of columns will round up if the requested number of columns has a fractional column in excess of 0.75, and otherwise will round down. This value of 0.75 could be altered by user or author input.

Block 2248 provides for determining a live matter width and receives inputs from block 2232, optimum, minimum and maximum column width, block 2240, potential live matter width, block 2244, column preference, and block 2246, column count.

Because an actual live matter width ($LW_A$) can never be greater than the potential live matter width ($LW_O$) computed previously, the computation compares the computed value with the potential width to verify which is smaller. The smaller is determinative. Computing the live matter width also has special cases based on a user's markup for column preference. If the column preference="Single", then block 2248 provides for as large a column on the page as will fit within the parameters of the clusters per line 2204 and font size 2214. If column preference is "Low" the reading metrics engine 240 attempts an optimum reading experience. A higher column preference can be bounded by the width of the available space. The following pseudocode demonstrates the determination of live matter width.

```
IF CP=0,
    THEN Minimum of CW_M or LW_O=LW_A
ELSE
    IF CP=1,
        THEN Minimum of (CC_A×CW_O)+(CW_O×(CP-1)×
            0.075) or LW_O=LW_A
    ELSE LW_O=LW_A.
```

Column count 2246 and live matter width 2248 are inputs to block 2250, which computes an actual gutter width ($CG_A$). The gutter width can be equivalent to the markup property column gap. One difference is that a measurement unit for block 2250 can be based on a fraction of the column, but could affect the measure of a column slightly in multi-column spreads. The following equation can determine an actual gutter width ($CG_A$):

$$LW_A \div CC_A \times 0.075 = CG_A.$$

Referring to block 2252, once an actual gutter width is determined, an actual column width ($CW_A$) can be determined which can be equivalent to the Markup property ColumnWidth. Once the column count, the live width and the gutter are known, an exact column unit can be computed using the following equation:

$$(LW_A \div CC_A)-((CC_A-1) \times CG_A)=CW_A.$$

Referring to block 2254, reading metrics engine 240 computes an actual font size ($FS_A$) using inputs from blocks 2252, 2212, 2214 and 2230. In one embodiment, the actual font size is performed by computing a recommended font size ($FS_r$) for the layout, and then checking the recommended font size against the minimum font size and maximum font size to insure that the font size is within the range that was computed earlier. The first is also a conditional process determining if the line is too long or too short to use the optimum font size due to the number of clusters that would appear on the line. Only when the range of the number of clusters is exceeded at the optimum font size does the font change sizes. The following pseudocode can perform the calculations for block 2254:

```
IF: CW_A > FS_O × C_M ÷ C_pm
    THEN CW_A ÷ C_M × C_pm
    ELSE IF: CW_A < FS_O × C_m ÷ C_pm
    THEN: CW_A ÷ C_m × C_pm
ELSE: FS_O = FS_r
```

The bounds checking to finalize the actual font size ($FS_A$) is a conditional as well:

```
IF: FS_r > FS_M
    THEN: FS_M
    ELSE IF: FS_r < FS_m
    THEN: FS_m
ELSE: FS_r = FS_A
```

Referring now to block 2256, an actual clusters per line calculation is performed using values determined in block 2254 and block 2252. The actual clusters per line is a precursor to determining an appropriate amount of line height for a particular font. The following equation determines the clusters per line:

$$CW_A \div FS_A \times C_{pm}.$$

Referring to block 2258, reading metrics engine 240 determines the actual line height ($L_A$) as a multiplier of the font size that will be applied to the most readable text for this environment. The method for determining actual line height includes at least two adjustments. First, reading metrics engine 240 optimizes the line height for the font size if $FS_A \neq FS_O$. The optimization insures that larger fonts do not receive proportionally as much line height as smaller fonts. Next, reading metrics engine 240 adjusts the line height for the length of the line. The following equation performs the optimization and adjustment:

$$((C_A \times (1.047(FS_O-FS_A) \times (L_O-1))) \div C_{pl})+1.$$

The following portion of the equation:

$$(1.047(FS_O-FS_A) \times (L_O-1)),$$

adjusts for the font size. The remainder adjusts for the line length. The result is the optimum line height for the actual font size in the actual column width.

Figure 23:
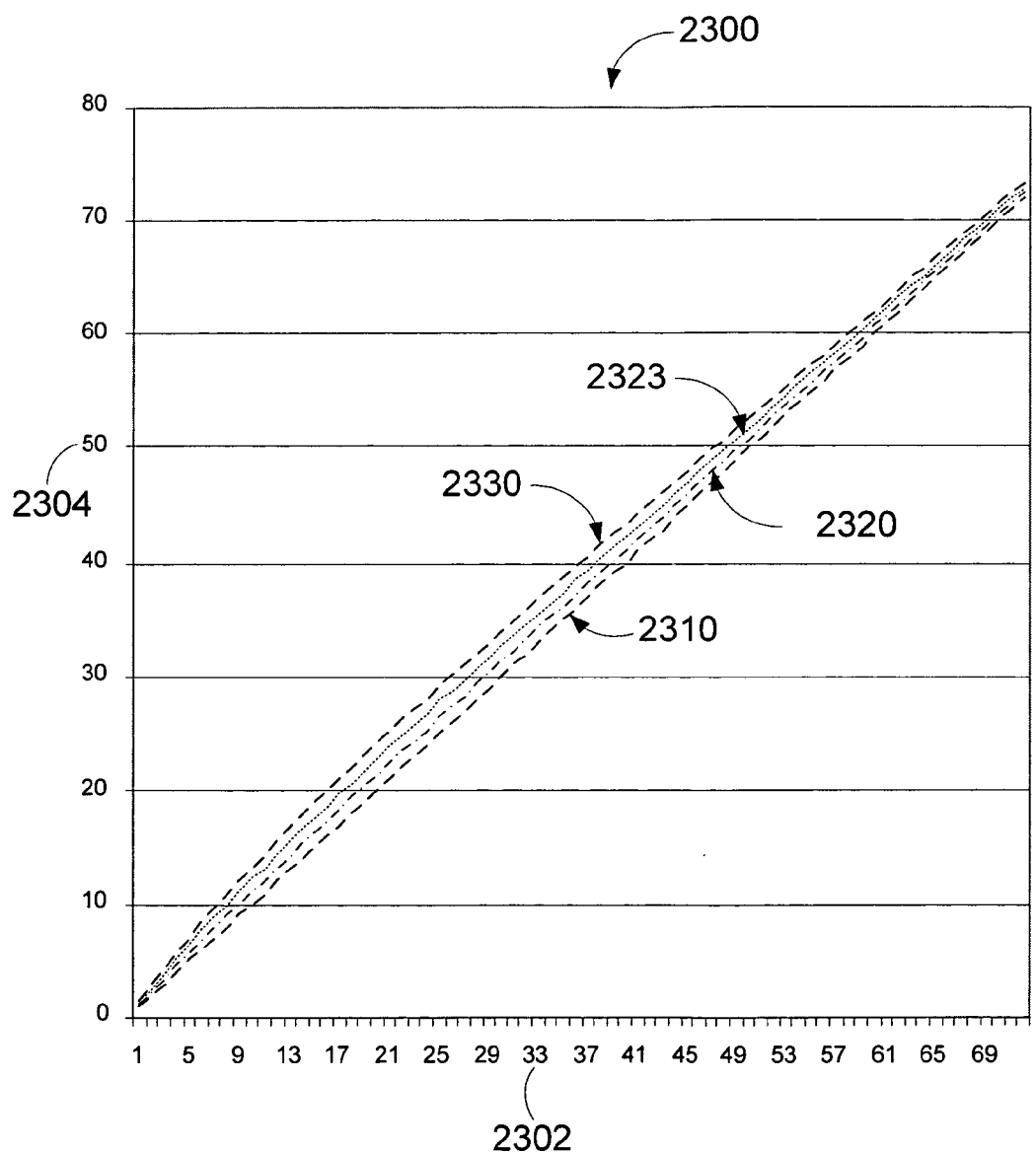
FIG. 23 is a graph illustrating line length determinations in accordance with an embodiment of the present invention.

Referring back to FIG. 20, the font size portion of the equation appears in FIG. 20. FIG. 23 illustrates a graph 2300 of the line length adjustment. As shown, x-axis 2302 represents the font size and y-axis 2304 represents the line height. An adjustment is made to line 2320 (the same as 2020) for a line half as long is shown in line 2323, and in line 2330 for a line 1.5 times as long.

Referring back to FIG. 22, block 2260 provides that the actual default heading font size is computed in substantially the same way as the body text Font-Size, but is based on a user settable 0.75 times the Minimum Clusters per Line ($C_m$) and the width of the actual live matter area ($LW_A$). The following equation applies:

$$HFSA=LW_A \div (0.75 \times C_m) \times C_{pm}.$$

In one embodiment, the heading font size anchors the top end of the scale for reading metrics engine 240 point output.

Referring to Block 2262, a default line height for the heading font size ($HL_A$) is determined according to the same equation as the actual line height for body text font size 2258. The multiplier is generated based on the HFSA, rather than the $FS_A$ and a user settable 0.75 times the minimum Clusters per line ($C_m$) as follows:

$$((0.75 \times C_m \times (1.047(FS_O\text{-}HFSA) \times (L_O\text{-}1))) \div C_{pl}) + 1 = HL_A.$$

The line height is flexible based on the length of the line and the size of the font and forms a different continuum between the body text size and the heading size for the multiplier of the font size. Therefore, as body text may have a line height 1.16 times the font size, the line height for heading font may be only 1.05 times the heading font size.

Referring now to block 2264, a reading metrics engine point is determined using inputs from the actual heading font size 2260 and actual font size 2254. The reading metrics engine point relates to two typographic reference points: optimum readable font size for the layout, and optimum top level heading size for the font in the window. Between these, reading metrics engine 240 plots a set number of increments, each of which is intersected as a typographic point for that font family. To transfer between "real" points of 1/72" and a Reading metrics engine Point, equivalents can be created for the top and bottom.

The value of the reading metrics engine point is based on the comparison of the default windows font size and the actual font size that has been computed. The default is 12 points. Therefore, in the translation to reading metrics engine 240 values, any reference to 12-point type is interpreted as a reference to $FS_A$. Sizes below 12 point are interpreted by a multiplier that divides the $FS_A$ into 12 parts. Hence:

$$\text{Reading Metrics Engine Point} = FS_A \div 12.$$

However, the value of a reading metrics engine point above 12 points is not necessarily the same as the value of a point at or below 12 points. The value of a reading metrics engine point above is based on the division of the space between a preset optimum Heading Size of 48 points (a default such as a Windows® text font size default) and the 12-point body text size. Therefore, above 12 points, the formula is:

$$\text{Reading metrics engine Point} = (HFSA\text{-}FS_A) \div 36.$$

In order to compute the output size of any markup FontSize ($FS\mu$), the following would be the composite formula:

IF, $FS\mu \leq 12$,
THEN, $FS\mu \times FS_A \div 12$
ELSE, $((FS\mu\text{-}12) \times ((HFSA\text{-}FS_A) \div 36)) + FS_A$.

As a result of this operation, any marked up FontSize can be interpreted according to the value of a Reading Metrics Engine Point, including the default measures for FontSizes that are generated from standards such as Cascading Style Sheet (CSS), as in XXSmall, XSmall, Small, Medium, Large, XLarge, XXLarge, and the default values for all HeadingLevels 1-7. Note that a Reading Metrics Engine Point applies only to FontSize points, and not to any other measurement in points.

Referring to block 2266, an actual margin value is a unit called "Margin" which may be used in combinations that will adjust the values of some other units (notably Column). The Actual Margin (MA) works backwards from the lesser of Live Matter Width ($LW_A$) or Window Height, and the MarginPreference (MP). If the Window Height is less than the Live Matter Width, then the actual margin is the Window Height times the MarginPreference. However, if the Live Matter Width is less than the Window Height, the reading metrics engine works backward from the Live Matter Width divided by 1 minus the MarginPreference. Hence, the formula for Margin ($M_A$) is as follows:

IF, $W_H < LW_A$
THEN, $W_H \times M_P$
ELSE, $((LW_A \div (1-2M_p)) - LW_A) \div 2$.

Referring to block 2268, a fundamental tool of layout designers for the past 500 years has been the grid. But they have always been considered as a static tool relevant to only one publication at a given page size. Allen Hurlburt in his 1977 book Layout: The Design of the Printed Page (Watson-Guptill Publications, NY, N.Y. 1977, 1989. Page 82.), incorporated herein by reference, states:

A designer's grid organizes specific content in relation to the precise space it will occupy. When the grid works, it will permit the designer to create many different layouts containing a variety of elements within the framework of the grid. When used in the design of a publication, an advertising campaign, or a series, it will give a sense of sequential continuity even when there is considerable variation in the content of each unit.

Although Hurlburt emphasizes the importance and necessity of a good grid both in this and in his later writings, The Grid (1978) and The Design Concept (1981), he emphasizes repeatedly that the static nature of the grid is precisely what makes it useful for designers to use. However, designers in the electronic world, in which the display size and shape is not known in advance, have floundered in being unable to create dependable grids unless they freeze the size and shape of the display in advance.

Reading metrics engine 240 outputs a GridUnit ($G_U$) 2268 that is dynamic and scalable across a wide variety of display and font sizes. The inputs to block 2268 include the actual column width ($CW_A$) 2252, actual font size ($F_{SA}$) 2254, clusters per best readable line ($C_{pl}$), and clusters per em ($C_{pm}$). The width of each GridUnit is based on a determination of the optimum Clusters per line ($C_{pl}$) balanced with the actual width of the column ($CW_A$). The equation divides the $C_{pl}$ by 6, and then determines how many units of that length will fit in the $C_{WA}$ at the $F_{SA}$. Fractional units are spread evenly over the widths of the whole GridUnits. Hence:

$$G_{UA} = CW_A \div \text{Trunc}((6 \times CW_A \times C_{pm}) \div (FS_A \times C_{pl})).$$

The grid has a single measurement, based on its width. If a GridUnit is used as the value for a unit of height, it has the same value as the value of width. In one embodiment, a GridUnit can be dynamic, dividing the vertical space differently than the horizontal space.

Referring to block 2270, the column unit has different dimensions when used in height and width. Thus, when used in markup, a width of 1 column has a different measurement than a height of 1 column. The actual column height, in an embodiment, is divisible by a whole number of Lines. Therefore, the Height of the Window ($W_H$), less the margins, equals the potential Live Matter Height ($L_{HO}$). The $L_{HO}$ divided by the Line ($L_A$), truncated times the Line equals the ColumnHeight ($C_H$). In other words, $W_H - (2 \times MA)$ (or other multiple if Markup indicates a deeper than 1 MA margin) = $L_{HO}$.

$$(\text{Truncated}(L_{HO}/L_A)) \times L_A = C_H.$$

Referring to block 2272, the actual PageHeight ($P_H$) is equal to the Column Height plus the top and bottom Margins. Therefore, $P_H = C_H + 2MA$ (or other multiple if Markup indicates a deeper than 1MA margin at either top or bottom).

Referring to block 2274, the actual PageWidth ($P_W$) is equal to the sum of the ColumnWidths, GutterWidths and Left and Right Margins. Therefore, $$P_W=(CW_A \times CC_A)+(CG_A \times (CC_A-1))+(2 \times MA).$$

Thus, the page has a different dimension in height as compared to width, and these may not be equal to the size of the Window.

Referring back to FIG. 2 in combination with FIGS. 22A-22D, the methods described above for determining line height, columns and font sizes enable automatic determinations of optimum sizes for readability on a viewing medium for the purpose of rendering text. In each case, an appropriate device for implementing the methods provided herein can include computer components such as a microprocessor to implement the methods. For example, for purposes of determining an optimum font size, a device, such as a printer or handheld computing device capable of communicating with a printer or rendering device can accept a width of a viewing medium and a distance from the viewing medium as inputs and providing as an output the optimum size and line height for a font, or automatically output using the optimum size and line heights determined. The device can also be a computer, a portable computing device, or a microprocessing unit installed within a printer and the like. The output of the printer or the device can be the viewing medium. Also, the viewing medium can be a printed page, a screen, a wirelessly connected viewing medium, a billboard, an image or any font-rendering medium. In some embodiments, entering dimensions of the viewing medium and distances from the viewing medium can be over a network or in a client-network environment, over an Internet connection or the like.

Figure 24:
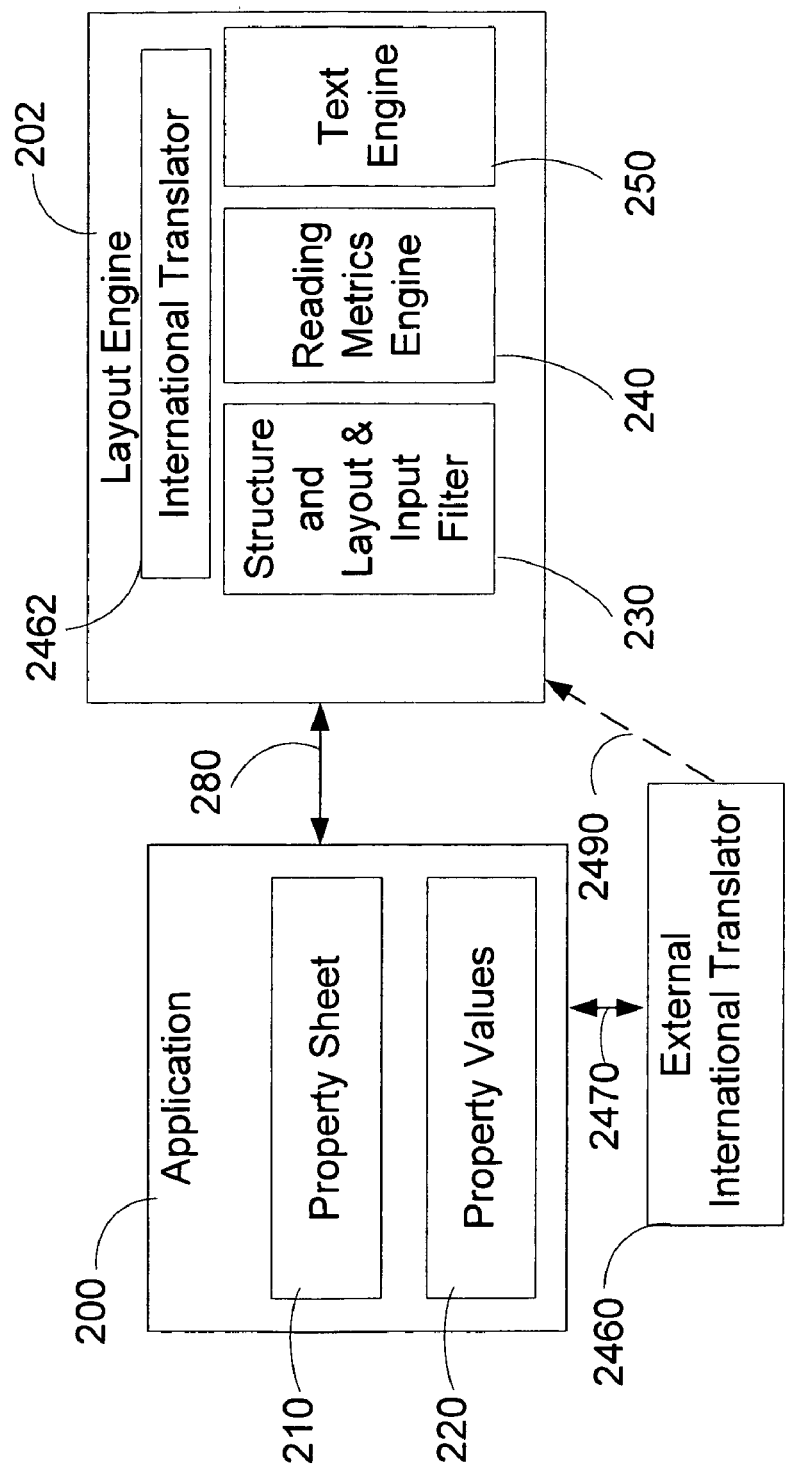
FIG. 24 is a block diagram illustrating data flow using an international translator within a computer system in accordance with an embodiment of the present invention.
Figure 25:
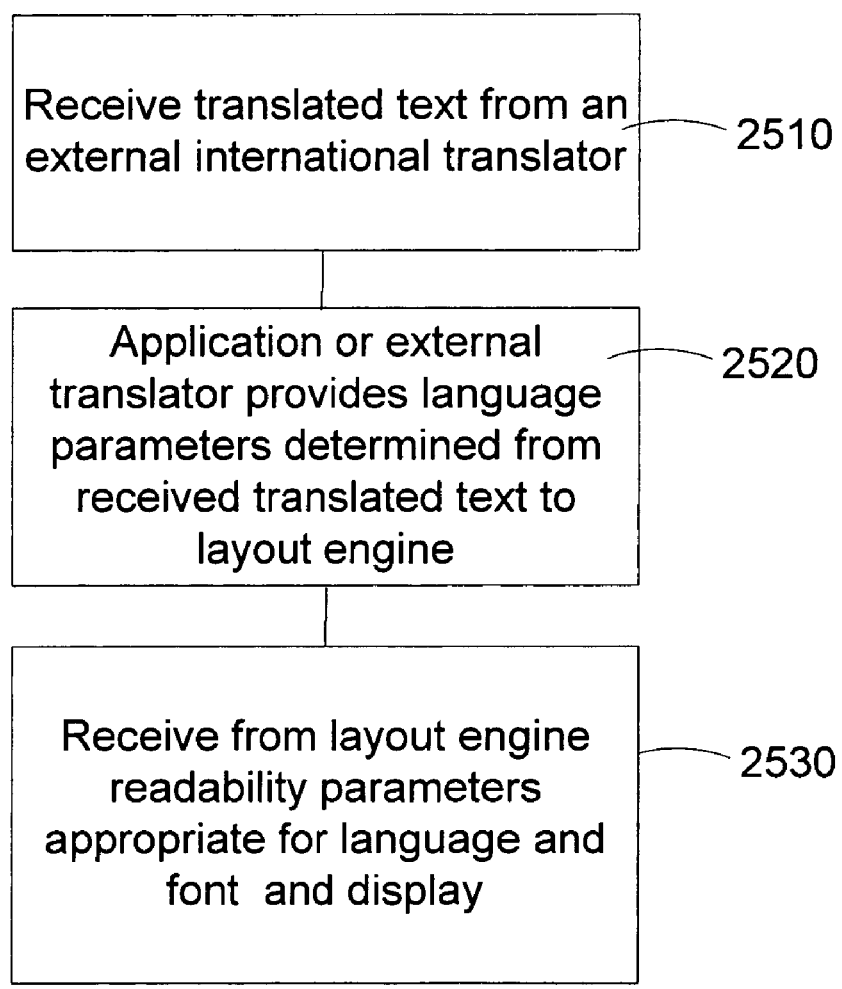
FIG. 25 is a flow diagram illustrating a method for using a translator in combination with embodiments in accordance with an embodiment of the present invention.

FIGS. 22A-22D described above illustrate operations that occur within layout engine 202, shown in FIG. 2. Referring now to FIG. 24, an embodiment is directed to using layout engine 202 in combination with an international translator. An international translator in this context includes software-type translators as are known in the art that are capable of translating text in a given language and providing an output in a different language. For example, there are known translators available over the Internet that would be appropriate for embodiments herein that will alter text located at a particular universal resource locator (URL) location to a different language. Referring to FIG. 24, a block diagram is shown including layout engine 202 and application 200. Application 200 could be any application running on computer 110 shown in FIG. 1. For this embodiment, appropriate application programs include, for example, Microsoft Word, Microsoft Publisher, QuarkXPress, Adobe InDesign as well as other applications that run with or over a server connection such as in conjunction with a browser or an email-type application such as Microsoft Outlook® and the like. Application 200 is shown including a property sheet 210 and property values 220, although, in an embodiment, the property sheet 210 and property values 220 could be accessed components such that the application 200 has only a link to another application that supplies the contents of property sheet 210 component and property values 220 component. FIG. 24 further shows an external international translator 2460 coupled to application 200 via connection 2470. External international translator is shown as an external component for those embodiments in which the application 200 accesses translation abilities through the Internet or over a server connection to a networked translator, such as over an area network. Alternatively, external international translator can be external only to the application 200, such as accessible via a central bus in a computer system. Referring to FIG. 25 in combination with FIG. 24, in an embodiment, external international translator 2460 translates text created by or received into application 200, at block 2510. The property changes that occur due to external international translator 2460 are provided either to application 200 to alter elements in property sheet 210 or property values 220 or provided directly to layout engine 202, as shown in block 2520. Layout engine 202, can have, but does not require for this embodiment, an international translator 2462. If present, external international translator 2460 can send and receive data from international translator 2462, which provides compatibility components to enable seamless interaction between an external international translator 2460 and layout engine 202 (block 2520). In one embodiment, external international translator 2460 provides translated text in a language and basic text to application 200, which then sends relevant data via connection 280 to layout engine 202 (block 2520). Layout engine 202 then operates on the data as discussed above to provide readability parameters to application 200 (block 2530). More specifically, layout engine 202, using reading metrics engine 240 and text engine 250, operates on the data received by application 200 and/or directly from external international translator 2460 to provide translated text in a readable format with column, line height, font size and the like appropriate for the language to which text is translated.

Figure 26:
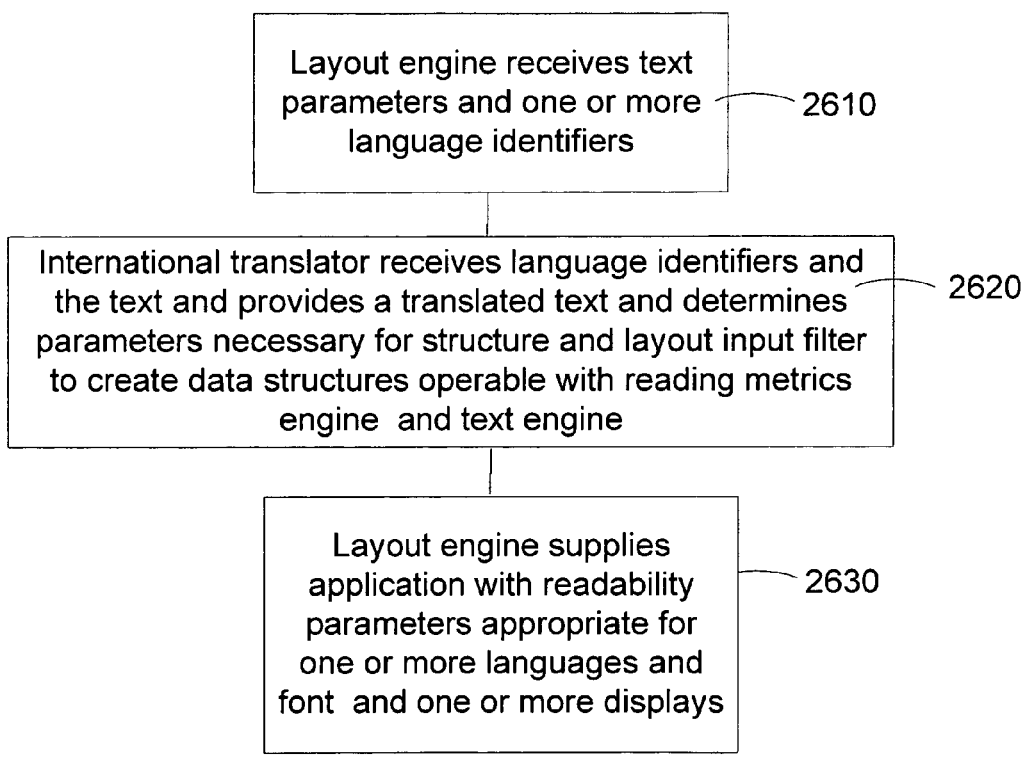
FIG. 26 is a flow diagram illustrating a method for using a translator within a layout engine in accordance with an embodiment of the present invention.

In an alternative embodiment, as shown in FIG. 26, application 200 does not interact with an external international translator, but supplies text data to layout engine 202 along with language identifiers indicating the language supplied and one or more languages desired to be output (block 2610). International translator 2462 then receives the language identifiers and the text and provides a translated text for purposes of determining the parameters necessary for structure and layout input filter 230 to create data structures operable with reading metrics engine 240 and text engine 250 (block 2620). Thus, in an embodiment, application 200 can supply data to layout engine in one language and receive back data allowing application 200 to display multiple languages of the text that are formatted for the display for each language desired and appropriate for the individual languages (block 2630). Application 200 can also be running on different displays, each display having a different size and each display receiving the same text in a different language formatted for that display and that language. Thus, for example, if application 200 is running on a server that serves client machines in several countries, each display in the server group will receive text in an appropriate language, sized and formatted appropriately for that language and for the appropriate display. For a server running an email program or the like, application 200 can be operating on each client machine, such as Microsoft Outlook®, or can be running on a server, such as a Unix® server, and the server can be, for example, an exchange server type. The server or client machine running application 200 receives text in any language and can be configured to interact with layout engine 202 to automatically translate any received language to a local language or language of choice programmed in the international translator 2462, and output to application 200, the parameters necessary for formatting the translated text as appropriate for the language and for the display(s).

All of the references cited herein, including any patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A computer-readable storage media storing computer-executable instructions that, when executed by a processor, perform acts, comprising receiving a string of text organized in clusters, wherein individual clusters comprise a rendering unit of the string;

determining a value representing a number of clusters per em in the string of text;

determining a number of clusters per fixation for a language type;

determining a diameter of a focus area utilizing a foveal angle;

determining an optimum font size from the diameter multiplied by the value divided by the number of clusters per fixation for the language type; and, automatically displaying the determined optimum font size on a viewing medium.

2. A method, comprising receiving a string of text organized in clusters, wherein individual clusters comprise a rendering unit of the string;

determining a value representing a number of clusters per em in the string of text;

determining a number of clusters per fixation for a language type;

determining a diameter of a focus area utilizing a foveal angle;

determining an optimum font size from the diameter multiplied by the value divided by the number of clusters per fixation for the language type; and, automatically displaying the determined optimum font size on a viewing medium.

* * * * *